US010821820B1

(12) United States Patent
Fliearman et al.

(10) Patent No.: US 10,821,820 B1
(45) Date of Patent: Nov. 3, 2020

(54) MULTI-MODE STARTER-GENERATOR DEVICE TRANSMISSION WITH SINGLE VALVE CONTROL

(71) Applicant: Deere & Company, Moline, IL (US)

(72) Inventors: Steven R. Fliearman, Coffeyville, KS (US); Douglas S. Base, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/386,001

(22) Filed: Apr. 16, 2019

(51) Int. Cl.
*B60K 6/365* (2007.10)
*B60K 6/485* (2007.10)
(Continued)

(52) U.S. Cl.
CPC .............. *B60K 6/365* (2013.01); *B60K 6/485* (2013.01); *B60K 6/547* (2013.01); *F02N 11/00* (2013.01);
(Continued)

(58) Field of Classification Search
CPC ........ B60K 6/365; B60K 6/485; B60K 6/547; B60K 2006/268; F16H 3/666; F16H 63/065; F16H 63/3026; F16H 2200/2007; F16H 2200/2035; F16H 2200/2066; F16H 2200/2082; F16D 25/10; F02N 11/00; F02N 15/046; B60Y 2200/221; B60Y 2200/92
See application file for complete search history.

(56) References Cited

U.S. PATENT DOCUMENTS 3,062,073 A 11/1962 Brass
3,150,544 A 9/1964 Brass
(Continued)

FOREIGN PATENT DOCUMENTS

DE 69218975 T2 7/1997
DE 19745995 A1 9/1998
(Continued)

OTHER PUBLICATIONS

German Search Report for application No. 1020182214956 dated May 28, 2019.
(Continued)

*Primary Examiner* — Tinh Dang
(74) *Attorney, Agent, or Firm* — Klintworth & Rozenblat IP LLP

(57) ABSTRACT

A power control system is provided for a work vehicle with an engine. A combination starter-generator device has an electric machine and a gear set configured to receive rotational input from the electric machine and the engine and to couple the electric machine and the engine in two power flow directions. The gear set operates in one of multiple relatively high-torque, low-speed start gear ratios in one direction, including a first start gear ratio corresponding to a cold engine start mode and a second start gear ratio corresponding to a warm engine start mode, and in a relatively low-torque, high-speed gear ratio in another direction corresponding to a generation mode. First and second clutch assemblies are selectively coupled to the gear set to effect the start gear ratios during the engine start modes. A control valve is fluidly coupled to selectively apply a fluid pressure to the clutch assemblies.

20 Claims, 13 Drawing Sheets

(51) Int. Cl.
*B60K 6/547* (2007.10)
*F16H 3/66* (2006.01)
*F16H 63/06* (2006.01)
*F16H 63/30* (2006.01)
*F16D 25/10* (2006.01)
*F02N 11/00* (2006.01)
*F02N 15/04* (2006.01)
*B60K 6/26* (2007.10)

(52) U.S. Cl.
CPC .......... *F02N 15/046* (2013.01); *F16D 25/10* (2013.01); *F16H 3/666* (2013.01); *F16H 63/065* (2013.01); *F16H 63/3026* (2013.01); *B60K 2006/268* (2013.01); *B60Y 2200/221* (2013.01); *B60Y 2200/92* (2013.01); *F16H 2200/2007* (2013.01); *F16H 2200/2035* (2013.01); *F16H 2200/2066* (2013.01); *F16H 2200/2082* (2013.01)

(56) References Cited

U.S. PATENT DOCUMENTS

| | | |
|---|---|---|
| 3,640,152 A | 2/1972 | Shirai et al. |
| 3,675,511 A | 7/1972 | Wakamatsu et al. |
| 4,708,030 A | 11/1987 | Cordner |
| 4,750,384 A | 6/1988 | Beiliveau |
| 4,862,009 A | 8/1989 | King |
| 4,926,713 A | 5/1990 | Madill |
| 5,033,994 A | 7/1991 | Wu |
| 5,418,400 A | 5/1995 | Stockton |
| 5,558,173 A | 9/1996 | Sherman |
| 5,856,709 A | 1/1999 | Ibaraki et al. |
| 6,371,877 B1 | 4/2002 | Schroeder et al. |
| RE37,743 E | 6/2002 | Yang |
| 6,409,622 B1 | 6/2002 | Bolz et al. |
| 6,484,596 B2 | 11/2002 | Puchas |
| 6,569,054 B2 | 5/2003 | Kato |
| 6,582,333 B2 | 6/2003 | Man |
| 6,746,354 B1 | 6/2004 | Ziemer |
| 6,770,005 B2 | 8/2004 | Aikawa et al. |
| 6,832,970 B2 | 12/2004 | Eibler |
| 6,852,063 B2 | 2/2005 | Takahashi et al. |
| 6,910,453 B2 | 6/2005 | Sugino et al. |
| 7,028,794 B2 | 4/2006 | Odahara et al. |
| 7,086,978 B2 | 8/2006 | Aikawa et al. |
| 7,223,191 B2 | 5/2007 | Aikawa et al. |
| 7,374,031 B2 | 5/2008 | Skorucak |
| 7,387,043 B2 | 6/2008 | Sakamoto et al. |
| 7,503,871 B2 | 3/2009 | Kozarekar et al. |
| 7,753,147 B2 | 7/2010 | Usoro |
| 7,780,562 B2 | 8/2010 | King et al. |
| 8,143,735 B2 | 3/2012 | Bauer |
| 8,226,517 B2 | 7/2012 | Tsai et al. |
| 8,235,859 B2 | 8/2012 | Yun |
| 8,500,601 B2 | 8/2013 | Arnold et al. |
| 8,727,944 B2 | 5/2014 | Noboru et al. |
| 8,734,281 B2 | 5/2014 | Ai et al. |
| 9,074,656 B2 | 7/2015 | Benz et al. |
| 9,145,136 B2 | 9/2015 | Suntharalingam et al. |
| 9,184,646 B2 | 11/2015 | Fulton |
| 9,261,064 B2 | 2/2016 | Patel et al. |
| 9,371,810 B2 | 6/2016 | Creviston |
| 9,421,855 B2 | 8/2016 | Suntharalingam et al. |
| 9,541,172 B1 | 1/2017 | Wright |
| 9,555,795 B2 | 1/2017 | Nefcy et al. |
| 9,676,265 B2 | 6/2017 | Choi |
| 10,183,569 B2 | 1/2019 | Toyota et al. |
| 10,479,187 B2 | 11/2019 | Lubben et al. |
| 10,518,626 B2 | 12/2019 | Pettersson |
| 10,591,025 B2 | 3/2020 | Fliearman et al. |
| 2002/0019284 A1 | 2/2002 | Aikawa et al. |
| 2002/0033059 A1 | 3/2002 | Pels et al. |
| 2002/0117860 A1 | 8/2002 | Man et al. |
| 2002/0177504 A1 | 11/2002 | Pels et al. |
| 2003/0001391 A1 | 1/2003 | Kuang et al. |
| 2003/0104900 A1 | 6/2003 | Takahashi |
| 2003/0224888 A1 | 12/2003 | Wilder et al. |
| 2004/0055800 A1 | 3/2004 | Katou et al. |
| 2004/0116226 A1 | 6/2004 | Baker et al. |
| 2006/0166777 A1 | 7/2006 | Aikawa et al. |
| 2007/0157899 A1 | 7/2007 | Seufert et al. |
| 2007/0265126 A1 | 11/2007 | Janson et al. |
| 2008/0179119 A1 | 7/2008 | Grenn et al. |
| 2008/0314195 A1 | 12/2008 | Andoh et al. |
| 2009/0055061 A1 | 2/2009 | Zhu |
| 2009/0176611 A1 | 7/2009 | Avery |
| 2009/0264241 A1 | 10/2009 | Dittrich et al. |
| 2010/0029428 A1 | 2/2010 | Abe et al. |
| 2010/0044183 A1 | 2/2010 | Guggolz et al. |
| 2010/0063704 A1 | 3/2010 | Okubo et al. |
| 2010/0076634 A1 | 3/2010 | Brigham |
| 2011/0010031 A1 | 1/2011 | Syed et al. |
| 2011/0053729 A1 | 3/2011 | Parsons et al. |
| 2011/0070999 A1 | 3/2011 | Soliman et al. |
| 2011/0263379 A1 | 10/2011 | Liang et al. |
| 2012/0103293 A1 | 5/2012 | Robinette et al. |
| 2012/0235473 A1 | 9/2012 | Jiang et al. |
| 2012/0240723 A1 | 9/2012 | Gluckler et al. |
| 2013/0046427 A1 | 2/2013 | Hohenberg |
| 2013/0252773 A1 | 9/2013 | Suntharalingam et al. |
| 2013/0316873 A1 | 11/2013 | Jansen et al. |
| 2014/0137824 A1 | 5/2014 | Jacques et al. |
| 2014/0150604 A1 | 6/2014 | Kaltenbach |
| 2014/0256490 A1 | 9/2014 | Honda |
| 2015/0239335 A1* | 8/2015 | Wachter ................. B60K 6/547 475/5 |
| 2016/0031438 A1 | 2/2016 | Matsui et al. |
| 2016/0031439 A1 | 2/2016 | Nefcy et al. |
| 2016/0052382 A1* | 2/2016 | Clark ....................... B60K 6/26 477/5 |
| 2016/0076629 A1 | 3/2016 | Modrzejewski et al. |
| 2016/0082821 A1* | 3/2016 | Mueller ................... B60K 6/48 180/65.21 |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0248196 A1 | 8/2017 | Turner et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2019/0084555 A1 | 3/2019 | Omura et al. |
| 2019/0176806 A1 | 6/2019 | Trent |
| 2019/0219022 A1 | 7/2019 | Palil et al. |
| 2019/0344655 A1 | 11/2019 | Pettersson |
| 2019/0351751 A1 | 11/2019 | Sato et al. |

FOREIGN PATENT DOCUMENTS

| | | |
|---|---|---|
| DE | 19927521 A1 | 6/2000 |
| DE | 19911924 A1 | 9/2000 |
| DE | 19923316 A1 | 11/2000 |
| DE | 10003741 A1 | 4/2001 |
| DE | 010007959 A1 | 8/2001 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 B4 | 3/2014 |
| DE | 102013203009 A1 | 8/2014 |

(56) References Cited

FOREIGN PATENT DOCUMENTS

| | | |
|---|---|---|
| DE | 102013012747 A1 | 9/2014 |
| DE | 102013206970 A1 | 10/2014 |
| DE | 102014200720 A1 | 2/2015 |
| DE | 102014200723 B3 | 2/2015 |
| DE | 102013219948 | 4/2015 |
| DE | 102017203026 A1 | 8/2017 |
| DE | 102017204269 A1 | 9/2017 |
| EP | 0645271 B1 | 3/1995 |
| EP | 1069310 A2 | 1/2001 |
| EP | 2272702 A2 | 1/2011 |
| EP | 2664785 | 11/2013 |
| GB | 0650564 | 2/1951 |
| JP | 2015116004 A | 6/2015 |
| WO | WO0188369 A1 | 11/2001 |
| WO | 200700107458 A2 | 9/2007 |

OTHER PUBLICATIONS

German Search Report for application No. 1020172030267 dated Aug. 4, 2017.
Deere & Company, Multi-Mode Integrated Starter-Generator Device, Utility U.S. Appl. No. 16/385,860, filed Apr. 16, 2019.
Deere & Company, Multi-Mode Integrated Starter-Generator Device With Preloaded , Clutch, Utility U.S. Appl. No. 16/385,892, filed Apr. 16, 2019.
Deere & Company, Multi-Mode Integrated Starter-Generator Device With Magnetic Cam Assembly, Utility U.S. Appl. No. 16/385,934, filed Apr. 16, 2019.
Deere & Company, Multi-Mode Integrated Starter-Generator Device With Cam Arrangement, Utility U.S. Appl. No. 16/385,964, filed Apr. 16, 2019.
Deere & Company, Multi-Mode Integrated Starter-Generator Device With Dog Clutch Arrangement, Utility U.S. Appl. No. 16/385,989, filed Apr. 16, 2019.
Deere & Company, Multi-Mode Integrated Starter-Generator Device With Preloaded Cluth, Utility U.S. Appl. No. 16/385,784, filed Apr. 16, 2019.
Deere & Company, Multi-Mode Integrated Starter-Generator Device With Electromagnetic Actuation Assembly, Utility U.S. Appl. No. 16/386,020, filed Apr. 16, 2019.
Deere & Company, Multi-Mode Integrated Starter-Generator Device With Transmission Assembly Mounting Arrangement, Utility U.S. Appl. No. 16/386,052, filed Apr. 16, 2019.
Deere & Company, Multi-Mode Integrated Starter-Generator Device With Solenoid Cam Actuation Apparatus, Utility U.S. Appl. No. 16/386,075, filed Apr. 16, 2019.
USPTO Non-Final Office Action dated Sep. 9, 2019 for Utility U.S. Appl. No. 15/834,356.
USPTO Non-Final Office Action dated Feb. 25, 2019 for Utility U.S. Appl. No. 15/834,356.
USPTO Non-Final Office Action dated Nov. 1, 2018 for Utility U.S. Appl. No. 15/825,520.
USPTO Non-Final Office Action dated Nov. 2, 2017 for Utility U.S. Appl. No. 15/056,767.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 28, 2018 for Utility U.S. Appl. No. 15/056,767.
German Search Report for application No. 1020182189080 dated May 27, 2019.
German Search Report for application No. 1020182180784 dated Jun. 4, 2019.
Harmonic Drive LLC, Harmonic Planetary Precision Gearing & Motion Control, Product Brochure, Mar. 2006.
NTN Automotive Sales Headquarters, Compact Clutch Integrated Pulley for Alternators, NTN Technical Review No. 75, 2007.
North Atalantic Starter, Starter Drives Explained, Northatlan.com, 2005.
Deere & Company, Utility U.S. Appl. No. 15/825,520, filed Nov. 29, 2017.
Ioan-Adrian Viorel et al., Integrated Starter-Generators for Automotive Applications, Technical University of Cluj-Romania, Dept. of Electrical Machines, vol. 45, No. 3, 2004.
USPTO Non-Final Office Action dated Mar. 4, 2020 for U.S. Appl. No. 16/385,934.
USPTO Non-Final Office Action dated Jun. 19, 2020 for U.S. Appl. No. 16/386,075.
USPTO Non-Final Office Action dated Aug. 24, 2020 for U.S. Appl. No. 16/385,964.
USPTO Non-Final Office Action dated Aug. 24, 2020 for U.S. Appl. No. 16/385,784.
German Search Report issued in counterpart application No. 102020204706.5 dated Sep. 3, 2020 (07 pages).

* cited by examiner

MULTI-MODE STARTER-GENERATOR DEVICE TRANSMISSION WITH SINGLE VALVE CONTROL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and devices are typically required, thereby raising issues with respect to size, cost, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine in both cases.

In one aspect the disclosure provides a combination starter-generator for a work vehicle having an engine that includes an electric machine and a gear set configured to receive rotational input from the electric machine and from the engine. [claims].

In another aspect the disclosure provides a drivetrain assembly including an engine, an electric machine, and a gear set configured to receive rotational input from the electric machine and from the engine. [claims].

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
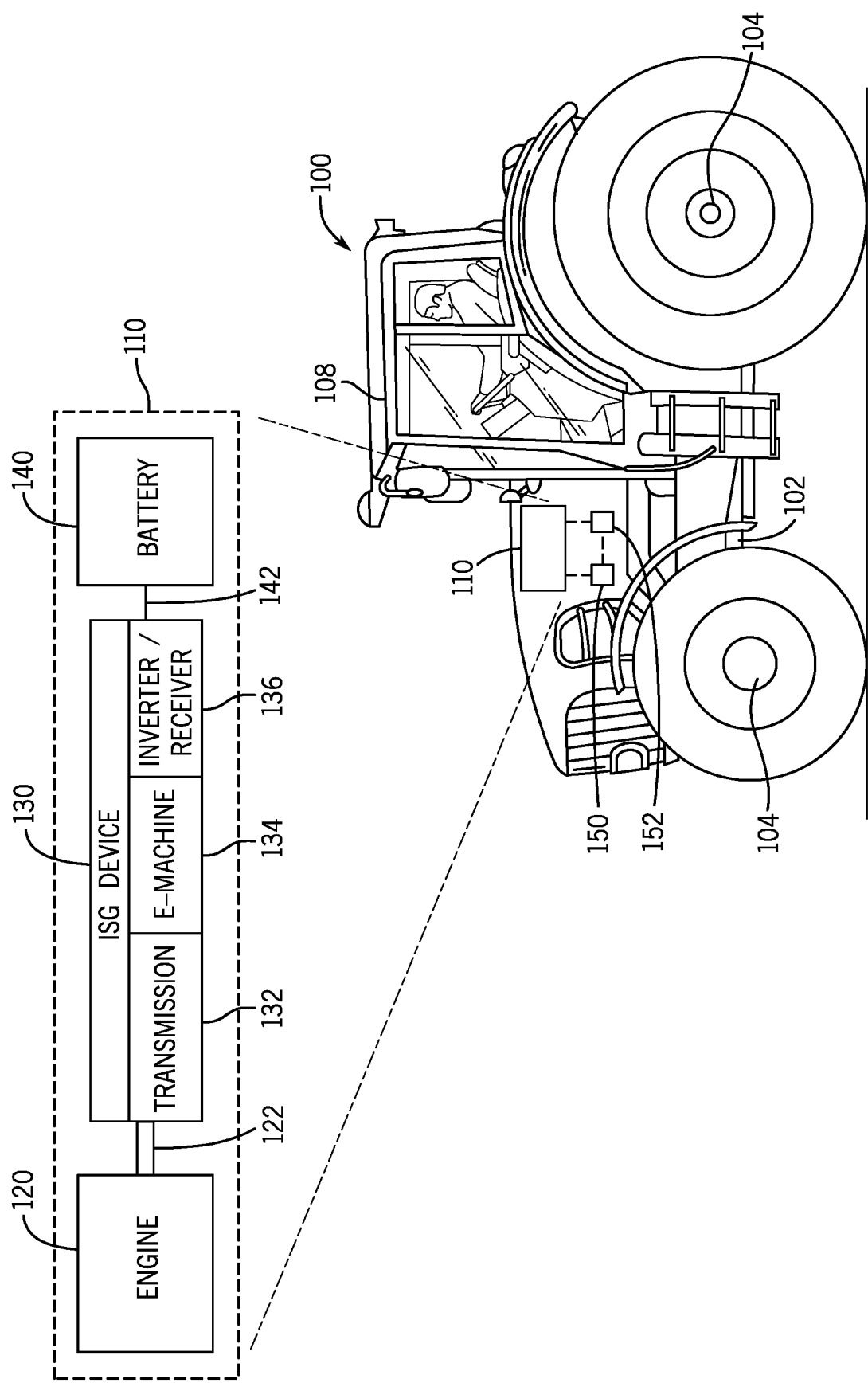
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include a direct mechanical power coupling to the engine that avoids the use of belts between the engine and the starter-generator device. For example, the starter-generator device may include within its housing a power transmission assembly with a gear set that directly couples to an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation. The direct power coupling between the starter-generator device and engine may increase system reliability, cold starting performance, and electric power generation of the system.

Further, in certain embodiments, the starter-generator device may have a power transmission assembly that automatically and/or selectively shifts gear ratios (i.e., shifts between power flow paths having different gear ratios). By way of example, the transmission assembly may include one or more passive engagement components that engage or disengage automatically when driven in particular directions and/or one or more active engagement components that are commanded to engage or disengage. For example, passive engagement components, such as a one-way clutch (e.g., a roller or sprag clutch), may be used to effect power transmission through a power flow path in the engine start up direction; and active engagement components, such as friction clutch assemblies, may be used to effect power transmission through other power flow paths. In this manner, bi-directional or other clutch (or other) configurations may be employed to carry out the cranking and generating functions with the appropriate control hardware. As a result of the bi-directional nature of the power transmission assembly, the power transfer belt arrangement may be implemented with only a single belt tensioner, thereby providing a relatively compact and simple assembly. In addition to providing torque in two different power flow directions, the gear set may also be configured and arranged to provide power transmission from the electric machine to the engine at one of two different speeds, e.g., according to different gear ratios. The selection of speed may provide additional functionality and flexibility for the power transmission assembly. For example, a lower speed or "first start" gear ratio may be provided to facilitate cold engine starts and a higher speed "second start" gear ratio may be provided to facilitate warm engine starts (or engine boost).

Control of the power transmission assembly with respect to the active clutch assemblies may take various forms. In one example, separate and dedicated control valves may be utilized to individually operate two active clutch assemblies. In further examples, a single control valve may be utilized to operate both clutch assemblies to perform the designated functions. Each implementation will be discussed in greater detail below.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system (or plant) 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, a battery 140, and a controller 150. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100.

The starter-generator device 130 couples the engine 120 to the battery 140 such that the engine 120 and battery 140 may selectively interact in at least three modes. In a first (or cold) engine start mode, the starter-generator device 130 converts electric power from the battery 140 into mechanical power to drive the engine 120 at a relatively high speed, e.g., during a relatively cold engine start up. In a second (or warm) engine start (or boost) mode, the starter-generator device 130 converts electric power from the battery 140 into mechanical power to drive the engine 120 at a relatively low speed, e.g., during a relatively warm engine start up (or to provide an engine boost). In a third or generation mode, the starter-generator device 130 converts mechanical power from the engine 120 into electric power to charge the battery 140. Additional details regarding operation of the starter-generator device 130 during the engine start (or boost) modes and the generation mode are provided below.

As introduced above, the controller 150 may be considered part of the power system 110 to control various aspects of the work vehicle 100, particularly characteristics of the power system 110. The controller 150 may be a work vehicle electronic controller unit (ECU) or a dedicated controller. In some embodiments, the controller 150 may be configured to receive input commands and to interface with an operator via a human-machine interface or operator interface (not shown) and from various sensors, units, and systems onboard or remote from the work vehicle 100; and in response, the controller 150 generates one or more types of commands for implementation by the power system 110 and/or various systems of work vehicle 100.

Generally, the controller 150 may be configured as computing devices with associated processor devices and memory architectures, as hydraulic, electrical or electro-hydraulic controllers, or otherwise. As such, the controller 150 may be configured to execute various computational and control functionality with respect to the power system 110 (and other machinery). The controller 150 may be in electronic, hydraulic, or other communication with various other systems or devices of the work vehicle 100. For example, the controller 150 may be in electronic or hydraulic communication with various actuators, sensors, and other devices within (or outside of) the work vehicle 100, including various devices associated with the power system 110. Generally, the controller 150 generates the command signals based on operator input, operational conditions, and routines and/or schedules stored in the memory. In some examples, the controller 150 may additionally or alternatively operate autonomously without input from a human operator. The controller 150 may communicate with other systems or devices (including other controllers) in various known ways, including via a CAN bus (not shown), via wireless or hydraulic communication means, or otherwise.

Additionally, power system 110 and/or work vehicle 100 may include a hydraulic system 152 with one or more electro-hydraulic control valves (e.g., solenoid valves) that facilitate hydraulic control of various vehicle systems, particularly aspects of the starter-generator device 130. The hydraulic system 152 may further include various pumps, lines, hoses, conduits, tanks, and the like. The hydraulic system 152 may be electrically activated and controlled according to signals from the controller 150. In one example and as discussed in greater detail below, the hydraulic system 152 may be utilized to engage and/or disengage clutch assemblies within the starter-generator device 130, e.g., by applying and releasing hydraulic pressure based on signals from the controller 150. Other mechanisms for controlling such clutch assemblies may also be provided.

In one example, the starter-generator device 130 includes a power transmission assembly (or transmission) 132, an electric machine or motor 134, and an inverter/rectifier device 136, each of which may be operated according to command signals from the controller 150. The power transmission assembly 132 enables the starter-generator device 130 to interface with the engine 120, particularly via a crank shaft (or other engine power transfer element) 122 of the engine 120. The power transmission assembly 132 may include gear sets in various configurations to provide suitable power flows and gear reductions, as described below. The power transmission assembly 132 variably interfaces with the electric machine 134 in two different power flow directions such that the electric machine 134 operates as a motor during the engine start modes and as a generator during the generation mode. In one example, discussed below, the power transmission assembly 132 is coupled to the electric machine 134 via a power transfer belt arrangement. This arrangement, along with the multiple gear ratios provided by the power transmission assembly 132, permit the electric machine 134 to operate within optimal speed and torque ranges in both power flow directions. The inverter/rectifier device 136 enables the starter-generator device 130 to interface with the battery 140, such as via direct hard-wiring or a vehicle power bus 142. In one example, the inverter/rectifier device 136 inverts DC power from the battery 140 into AC power during the engine start modes and rectifies AC power to DC power in the generation mode. In some embodiments, the inverter/rectifier device 136 may be a separate component instead of being incorporated into the starter-generator device 130. Although not shown, the power system 110 may also include a suitable voltage regulator, either incorporated into the starter-generator device 130 or as a separate component.

Figure 2:
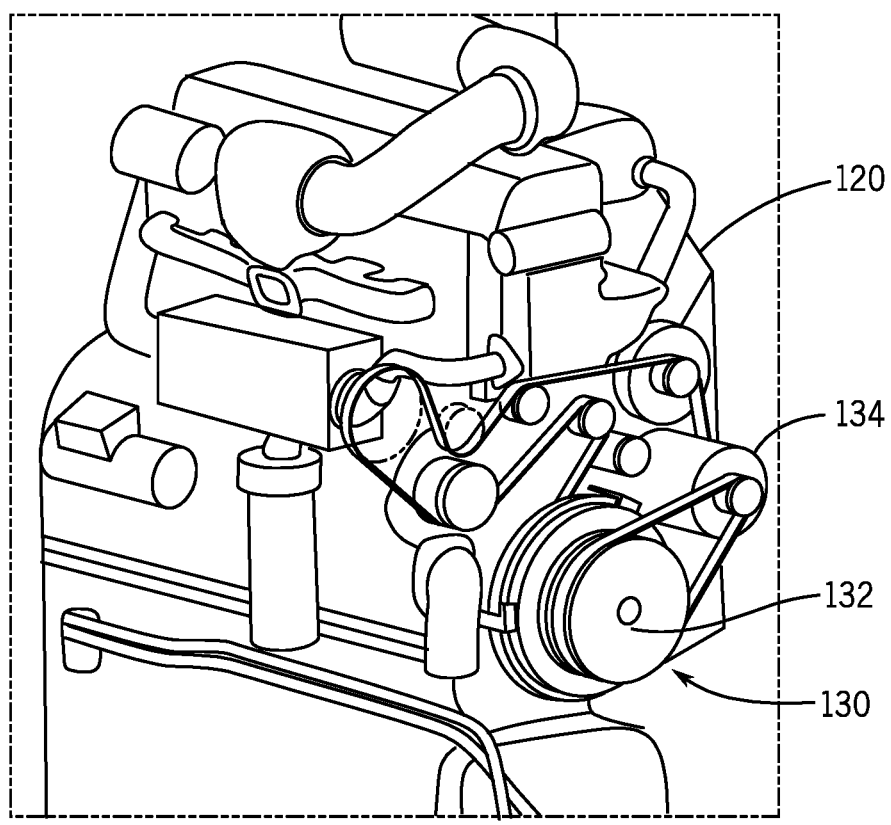
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., a crank shaft 122 as introduced in FIG. 1).

Figure 3:
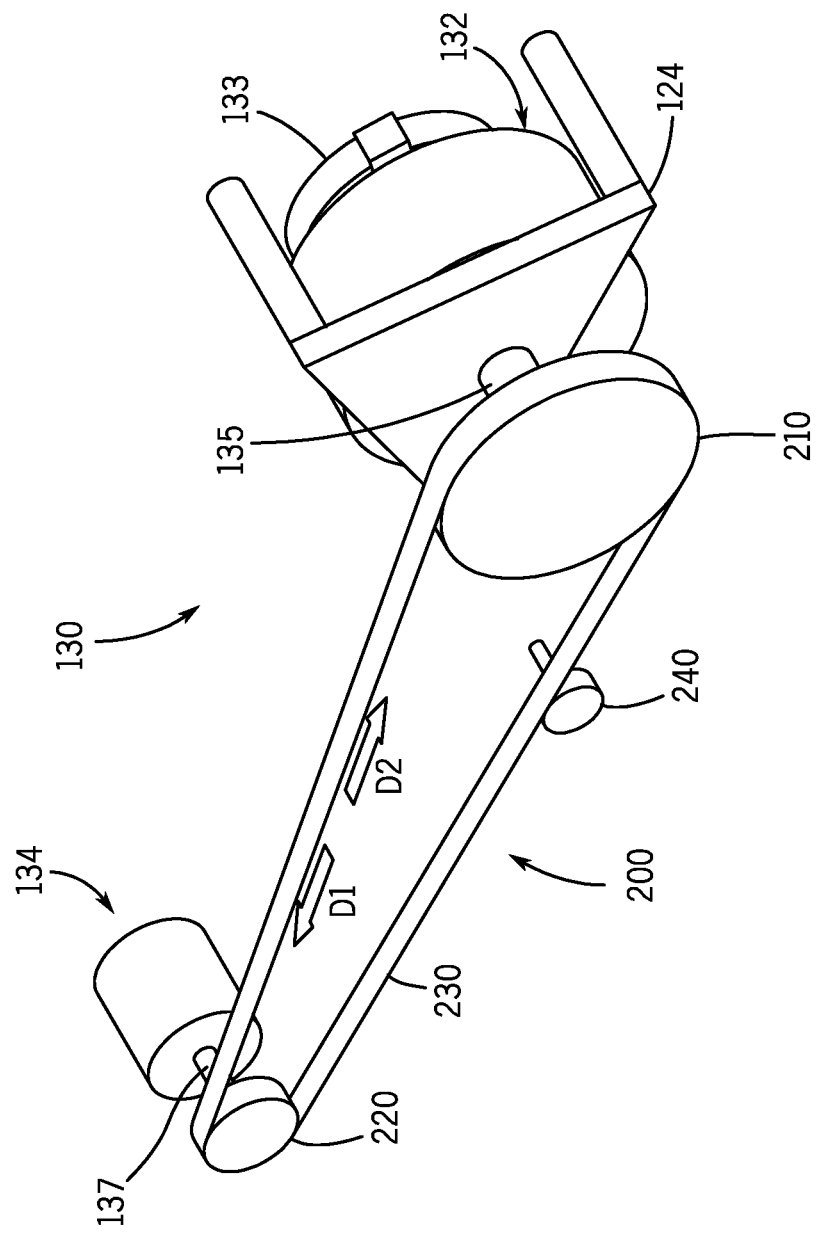
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided.

The power transmission assembly 132 is mounted to the engine 120 and may be supported by a reaction plate 124. As shown, the power transmission assembly 132 includes a first power transfer element 133 that is rotatably coupled to a suitable drive element of the engine 120 (e.g., crank 122 of FIG. 1) and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the engine start modes, the electric machine 134 pulls the belt 230 to rotate pullies 210, 220 in a first clock direction D1 to drive the power transmission assembly 132 (and thus the engine 120); and during the generation mode, the power transmission assembly 132 enables the engine 120 to pull the belt 230 and rotate pullies 210, 220 in a second clock direction D2 to drive the electric machine 134.

As a result of the bi-directional configuration, the power transfer belt arrangement 200 may include only a single belt tensioner 240 to apply tension to a single side of the belt 230 in both directions D1, D2. Using a single belt tensioner 240 to tension the belt 230 is advantageous in that it reduces parts and complexity in comparison to a design that requires multiple belt tensioners. As described below, the bi-directional configuration and associated simplified power transfer belt arrangement 200 are enabled by the bi-directional nature of the gear set in the power transmission assembly 132. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 4:
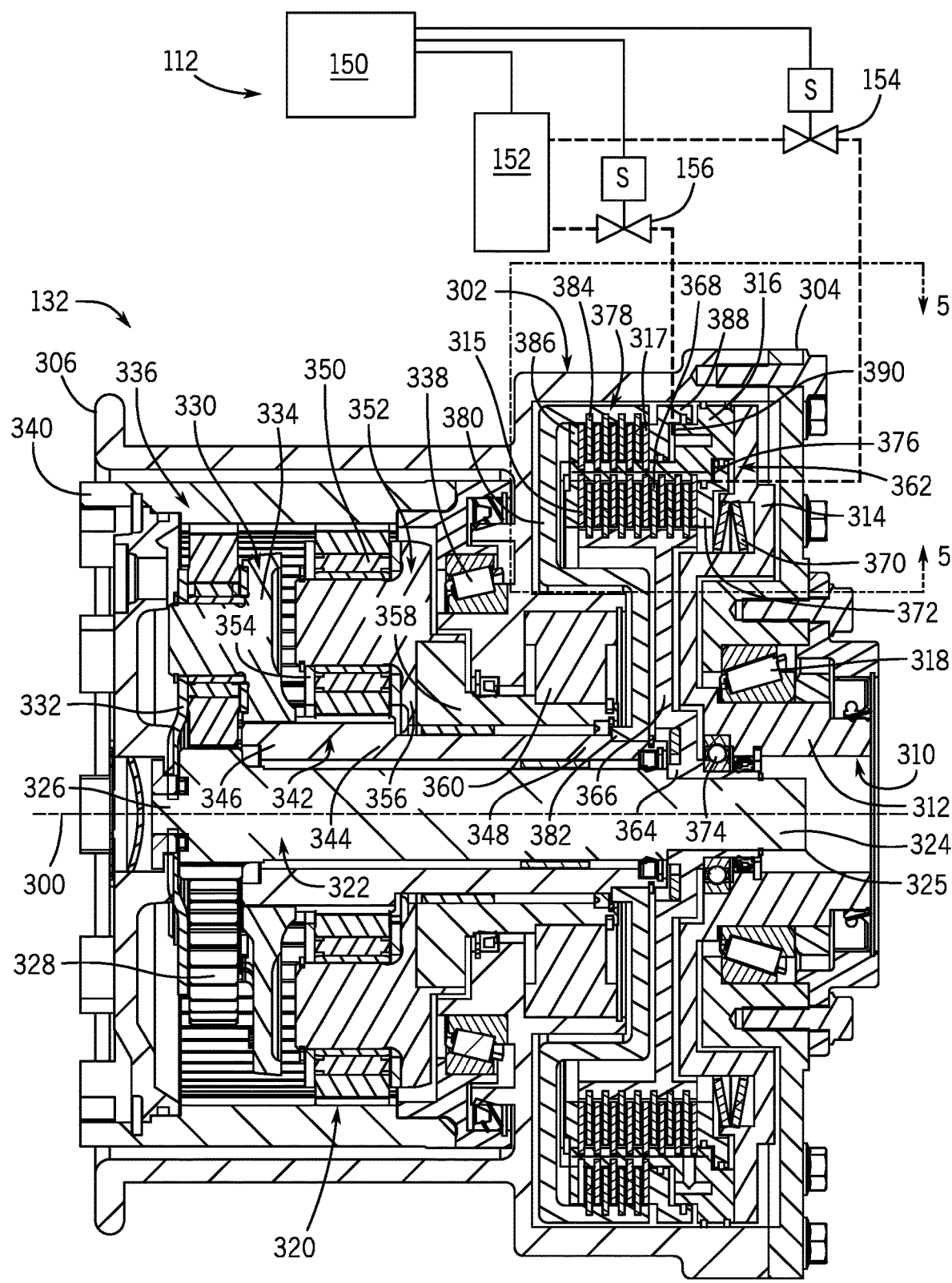
FIG. 4 is a cross-sectional view of a power transmission assembly of the example starter-generator device that may be implemented in the work vehicle of FIG. 1.

In one example, FIG. 4 depicts a cross-sectional view of the power transmission assembly 132 that may be implemented into the starter-generator device 130. As shown, the power transmission assembly 132 may be considered to be a unit with an annular housing 302 configured to house various components of the power transmission assembly 132. The housing 302 may be fixedly mounted to the engine 120, as reflected in FIG. 2. As described below, the housing 302 may include a number of internal flanges and elements that interact with or otherwise support the internal components of the power transmission assembly 132.

In the view of FIG. 4, a first side 304 of the housing 302 is oriented towards the electric machine 134, and a second side 306 of the housing 302 is oriented towards the engine 120. At the first side 304, the power transmission assembly 132 includes an input shaft 310 that interfaces with the electric machine 134 (e.g., via the power transfer belt arrangement 200). In particular, the input shaft 310 is fixed to the power transfer element 135 described above with reference to FIGS. 1 and 2. It should be noted that, although the shaft 310 is described as an "input" shaft, it may transfer power both into and out of the power transmission assembly 132, depending on the mode, as described below.

The input shaft 310 includes a base or hub 312 that is generally hollow and centered around a primary rotational axis 300 of the power transmission assembly 132. The input shaft 310 further includes an input shaft flange 314 with one end generally extending in a radial direction from the input shaft base 312. An input shaft clutch element 316 is positioned on the other end of the input shaft flange 314 and includes an inwardly extending set of plates 315 and an outwardly extending set of plates 317. As described in greater detail below, the input shaft 310 is supported by bearings 318 to rotate relative to the housing 302.

The power transmission assembly 132 further includes a planetary gear set 320 arranged within the housing 302. As described below, the gear set 320 is a two stage planetary gear set and generally enables the power transmission assembly 132 to interface with the electric machine 134 (e.g., via the power transfer belt arrangement 200) and the engine 120 (e.g., via direct coupling to the crank shaft 122 of the engine 120). Although one example configuration of the gear set 320 is described below, other embodiments may have different configurations.

In one example, the gear set 320 includes a first-stage sun gear 322 is formed by a shaft 324 with first and second ends 325, 326. The first end 325 of the first-stage sun gear shaft 324 is oriented towards the first side 304 of the power transmission assembly 132, and the second end 326 is oriented towards the second side 306 of the power transmission assembly 132. As described in greater detail below, a first clutch assembly 362 is splined or otherwise fixed on the first-stage sun gear shaft 324 at a position proximate to the first end 325. The second end 326 of the first-stage sun gear shaft 324 includes a plurality of teeth or splines that mesh with a set of first-stage planet gears 328.

In one example, the first-stage planet gears 328 include a single circumferential row of one or more planet gears, although other embodiments may include radially stacked rows, each with an odd number of planet gears. The first-stage planet gears 328 are supported by a first-stage planet carrier 330, which circumscribes the shaft 324 of the first-stage sun gear 322 and is at least partially formed by first and second radially extending, axially facing carrier plates 332, 334. The first-stage carrier plates 332, 334 include radially extending flanges that each provides a row of mounting locations for receiving axles extending through and supporting the first-stage planet gears 328 for rotation. As such, in this arrangement, each of the planet axles respectively forms an individual axis of rotation for each of the first-stage planet gears 328, and the first-stage planet carrier 330 enables the set of first-stage planet gears 328 to collectively rotate about the first-stage sun gear 322.

The gear set 320 further includes a ring gear 336 that circumscribes the first-stage sun gear 322 and the first-stage planet gears 328. The ring gear 336 includes radially interior teeth that engage the teeth of the first-stage planet gears 328. As such, first-stage planet gears 328 extend between, and engage with, the first-stage sun gear 322 and the ring gear 336.

The ring gear 336 is positioned on bearings 338 to rotate relative to the stationary housing 302. With respect to the planetary gear set 320, the ring gear 336 may function as the power transfer element 133 relative to the engine 120. In particular, the ring gear 336 includes a number of castellations 340 that extend axially about the circumference of the axial face that faces the engine 120. The castellations 340 engage and rotatably fix the ring gear 336 to the crank shaft 122 of the engine 120.

The gear set 320 further includes a second-stage sun gear 342 formed by a generally hollow shaft 344 that circumscribes the first-stage sun gear 322 and extends between first and second ends 346, 348. The first-stage planet carrier 330 has a splined engagement with, or is otherwise fixed to, the second-stage sun gear shaft 344 proximate to the first end 346. As described in greater detail below, a second clutch assembly 362 may be mounted on the second-stage sun gear shaft 344 at a position proximate to the second end 348.

Additionally, the second-stage sun gear shaft 344 may include a series of splines that mesh with a set of second-stage planet gears 350. The second-stage planet gears 350 are supported by a second-stage planet carrier 352 formed by first and second planet carrier plates 354, 356. The second-stage planet gears 350 are positioned to additionally engage with the ring gear 336. The second-stage planet gears 350 each have an axle that extends between the two carrier plates 354, 356 that enable each planet gear 350 to rotate relative to the planet carrier 352 about the respective axle. As such, the second-stage planet gears 350 are positioned in between, and engage with each of, the second-stage sun gear 342 and the ring gear 336. In some examples, each second-stage planet gear 350 has a different number of teeth than each corresponding first-stage planet gear 328, while in other examples, each second-stage planet gear 350 has the same number of teeth as each corresponding first-stage planet gear 328.

The second-stage planet carrier 352 may further include an annular planet carrier hub 358 that extends in an axial direction from one of the planet carrier plates 356. As described in greater detail below, an overrun (or third) clutch assembly 360 may be arranged in between the second-stage planet carrier hub 358 and the housing 302 that enables the second-stage planet carrier 352 to be fixed to the housing 302 in one rotational direction and the second-stage planet carrier 352 to rotate relative to the housing 302 in the other rotational direction.

In addition to the overrun clutch assembly 360 and as introduced above, the gear set 320 further includes one or more clutch assemblies 362, 378 that operate as torque application components that selectively engage and disengage to modify the torque transfer within the gear set 320, and thus, between the engine 120 and the electric machine 134. Although example implementations of the clutch assemblies 362, 378 are described below, any of various clutch configurations may be used, including, for example, roller clutches, sprag clutches, wedge clutches, over-running clutches, hydraulic clutches, spring clutches, and mechanical diodes.

Any suitable mechanism for engaging and disengaging the first and second clutch assemblies 362, 378 may be provided. In one example, the first and second clutch assemblies 362, 378 may be actively engaged or disengaged as a result of hydraulic pressure that repositions respective clutch elements. In one example and schematically shown in FIG. 4, the controller 150 may command one or more control valves 154, 156 of the hydraulic system 152 to apply and release hydraulic pressure on the clutch assemblies 362, 378 with fluid from a fluid source. As discussed in greater detail below, the first control valve 154 is associated with the first clutch assembly 362, and the second control valve 156 is associated with the second clutch assembly 378. Collectively, one or more of the control valves 154, 156, the hydraulic system 152, power transmission assembly 132, and the controller 150 may be considered a power control system 112 that functions to implement the appropriate power flow path between the engine 120 and the electric machine 134.

The first clutch assembly 362 is functionally positioned in between the input shaft 310 and the first-stage sun gear 322. In a first or engaged position, the first clutch assembly 362 functionally locks the input shaft 310 to the first-stage sun gear 322 for collective rotation, and in a second or disengaged position, the first clutch assembly 362 functionally decouples the input shaft 310 from the first-stage sun gear 322 for independent rotation. In one embodiment, as discussed in greater detail below, the first clutch assembly 362 may be considered a "spring applied, hydraulically released" engagement and disengagement mechanism. As a result, the first clutch assembly 362 may be referenced below as a "SAHR" clutch assembly 362. Additional details about the structure and operation of the SAHR clutch assembly 362 are provided below.

Figure 5:
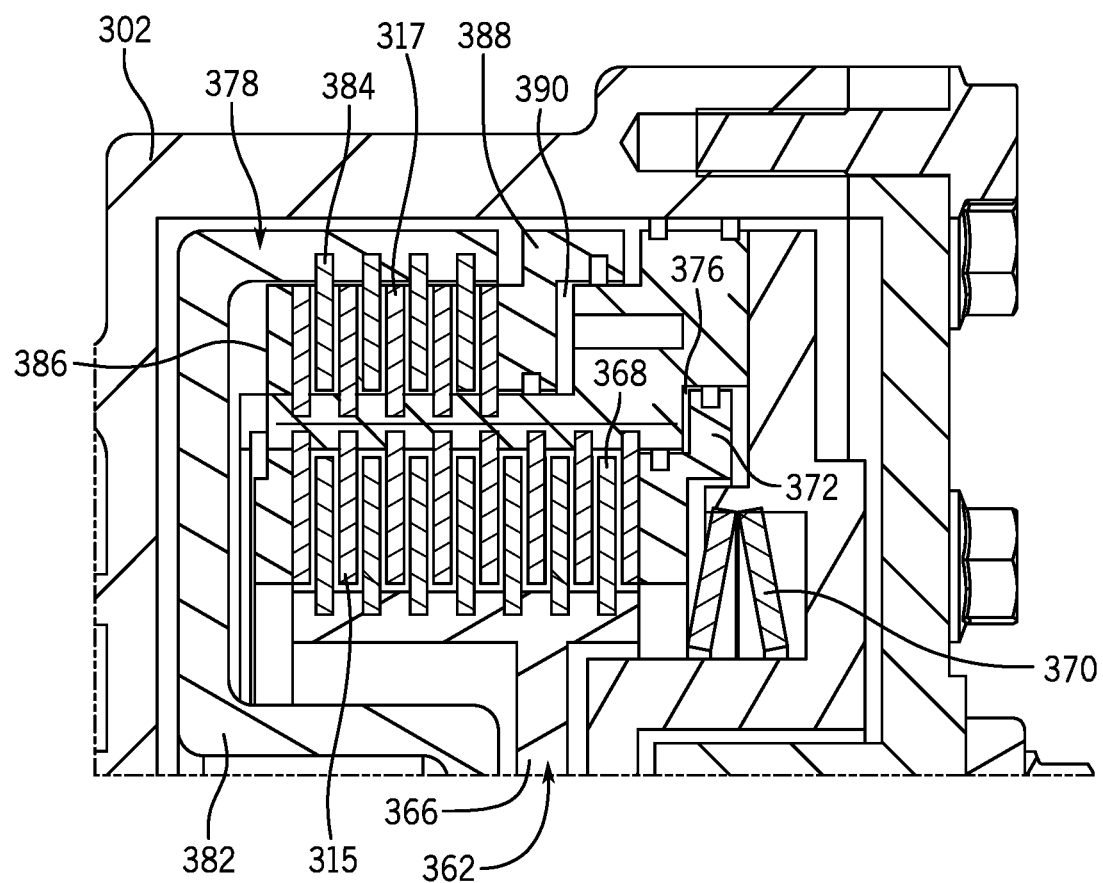
FIG. 5 is a more detailed view of a portion of the power transmission assembly of FIG. 4 for the example starter-generator device.

In addition to FIG. 4, reference is further made to FIG. 5, which is a more detailed view of a portion of FIG. 4. As shown, the SAHR clutch assembly 362 includes a SAHR clutch hub 364 that is mounted on and engaged for rotation with the first-stage sun gear 322. A bearing assembly 374 may be arranged between the SAHR clutch hub 364 and the input shaft 310 to enable relative rotation. A SAHR clutch flange 366 extends radially outward from the SAHR clutch hub 364 and includes a set of SAHR clutch plates 368 on a radial end. The SAHR clutch plates 368 extend radially outward from the SAHR clutch flange 366 and are positioned in an axial row so as to be interleaved between the inwardly extending set of plates 315 of the input shaft clutch element 316.

The SAHR clutch assembly 362 further includes a SAHR clutch spring 370 and a SAHR piston 372 that operate to reposition the SAHR clutch assembly 362 between the engaged position and the disengaged position. The SAHR clutch spring 370 may be arranged in any suitable position, including between the input shaft flange 314 and the SAHR clutch flange 366. During operation, SAHR clutch spring 370 functions to urge the SAHR clutch assembly 362 into the engaged position such that the SAHR clutch plates 368 frictionally engage the input shaft clutch element plates 315 of the input shaft clutch element 316, thereby locking the SAHR clutch assembly 362 and the first-stage sun gear 322 into rotational engagement with the input shaft clutch element 316 and the input shaft 310.

The SAHR piston 372 is coupled to the SAHR clutch plates 368 and is positioned relative to the input shaft clutch element 316 to form a cavity 376. As schematically shown, the cavity 376 is fluidly coupled to a source of fluid pressure from the hydraulic system 152 via the first control valve 154 that selectively provides and releases fluid into and out of the cavity 376. As noted above, the first control valve 154 may receive command signals from the controller 150 to supply and release fluid pressure within the cavity 376. When the control valve 156 is commanded to supply fluid into the cavity 376, the hydraulic force on the SAHR piston 372 functions to overcome the force of the SAHR clutch spring 370 and urge the SAHR clutch plates 368 out of engagement with the input shaft clutch element plates 315 and into the disengaged position. Subsequently, the controller 150 may command the first control valve 154 to release the hydraulic pressure such that the SAHR clutch spring 370 repositions the SAHR clutch assembly 362 back into the engaged position.

The second clutch assembly 378 is functionally positioned in between the input shaft 310 and the second-stage sun gear 342. In a first or engaged position, the second clutch assembly 378 functionally locks the input shaft 310 to the second-stage sun gear 342 for collective rotation, and in a second or disengaged position, the second clutch assembly 378 functionally decouples the input shaft 310 from the second-stage sun gear 342 for independent rotation. In one embodiment, as discussed in greater detail below, the second clutch assembly 378 may be considered a "hydraulically applied, spring released" engagement and disengagement mechanism. As a result, the second clutch assembly 378 may be referenced below as a "HASR" clutch assembly 378. Additional details about the structure and operation of the HASR clutch assembly 378 are provided below.

The HASR clutch assembly 378 is formed by a HASR hub 382 that is mounted on and engaged for rotation with the second-stage sun gear 342. A HASR flange 380 extends from the HASR hub 382 and includes inwardly extending HASR plates 384. The HASR clutch plates 384 extend radially outward from the HASR flange 380 and are positioned in an axial row so as to be interleaved between the outwardly extending set of plates 317 of the input shaft clutch element 316.

The HASR clutch assembly 378 further includes a HASR spring 386 and HASR piston 388 that operate to reposition the HASR clutch assembly 378 between an engaged position and a disengaged position. The HASR clutch spring 386 (schematically shown) may be arranged in any suitable position, including between the input shaft clutch element 316 and the HASR clutch plates 384.

The HASR piston 388 is coupled to the HASR clutch plates 384 and is positioned relative to the input shaft clutch element 316 to form a cavity 390. As schematically shown, the cavity 376 is fluidly coupled to a second source of fluid pressure from the hydraulic system 152 via the second control valve 156 that selectively provides and releases fluid into and out of the cavity 390. As noted above, the second control valve 156 may receive command signals from the controller 150 to supply fluid pressure to the cavity 390. The fluid pressure in the cavity 390 operates to overcome the force of the HASR clutch spring 386 and urge the HASR clutch assembly 378 into the engaged position such that the HASR clutch plates 384 frictionally engage the input shaft clutch element plates 317 of the input shaft clutch element 316, thereby locking the HASR clutch assembly 378 and the second-stage sun gear 342 into rotational engagement with the input shaft clutch element 316 and the input shaft 310. Generally, the HASR clutch spring 386 may have a lower spring force than the SAHR clutch spring 370. In some examples, the HASR clutch spring 386 may be omitted or another arrangement may be provided to return the HASR piston 388.

Upon release of the hydraulic pressure in the cavity 390, the HASR clutch spring 386 functions to urge the HASR clutch assembly 378 into the disengaged position such that the HASR clutch plates 384 are separated from the input shaft clutch element plates 315, thereby enabling mutually independent rotation of the second-stage sun gear 342 and the input shaft 310.

As introduced above, the variable power flow path elements of the power transmission assembly 132 further include the overrun clutch assembly 360 arranged in between the second-stage planet carrier hub 358 and the housing 302. The overrun clutch assembly 360 is a passive element that enables the second-stage planet carrier 352 to be fixed to the housing 302 in one rotational direction (e.g., the first clock direction D1) and the second-stage planet carrier 352 to rotate relative to the housing 302 in the other rotational direction (e.g., the second clock direction D2), as discussed in greater detail below.

As introduced above, the power transmission assembly 132 may be operated to selectively function in one of three different modes, including: a first or low engine start mode in which the power transmission assembly 132 transfers power from the battery 140 to the engine 120 with a first start gear ratio; a second or warm engine start mode in which the power transmission assembly 132 transfers power from the battery 140 to the engine 120 with a second start gear ratio; and a generation mode in which the power transmission assembly 132 transfers power from the engine 120 to the battery 140. Comparatively, the engine start modes are relatively low speed and relatively high torque output, and the generation mode is relatively high speed and relatively low torque output. In some scenarios and arrangements, the warm engine start mode may also be considered a boost mode in which the power transmission assembly 132 transfers power from the battery 140 to the engine 120 when the engine 120 is already operating. As such, the power transmission assembly 132 and the power transfer belt arrangement 200 are bi-directional and have different gearing ratios to transfer power in different power flow directions and along different power flow paths, depending on the mode. The power flow paths in the different modes are described below with reference to FIGS. 6-8 in which arrows are provided to schematically represent the flows of power.

Figure 6:
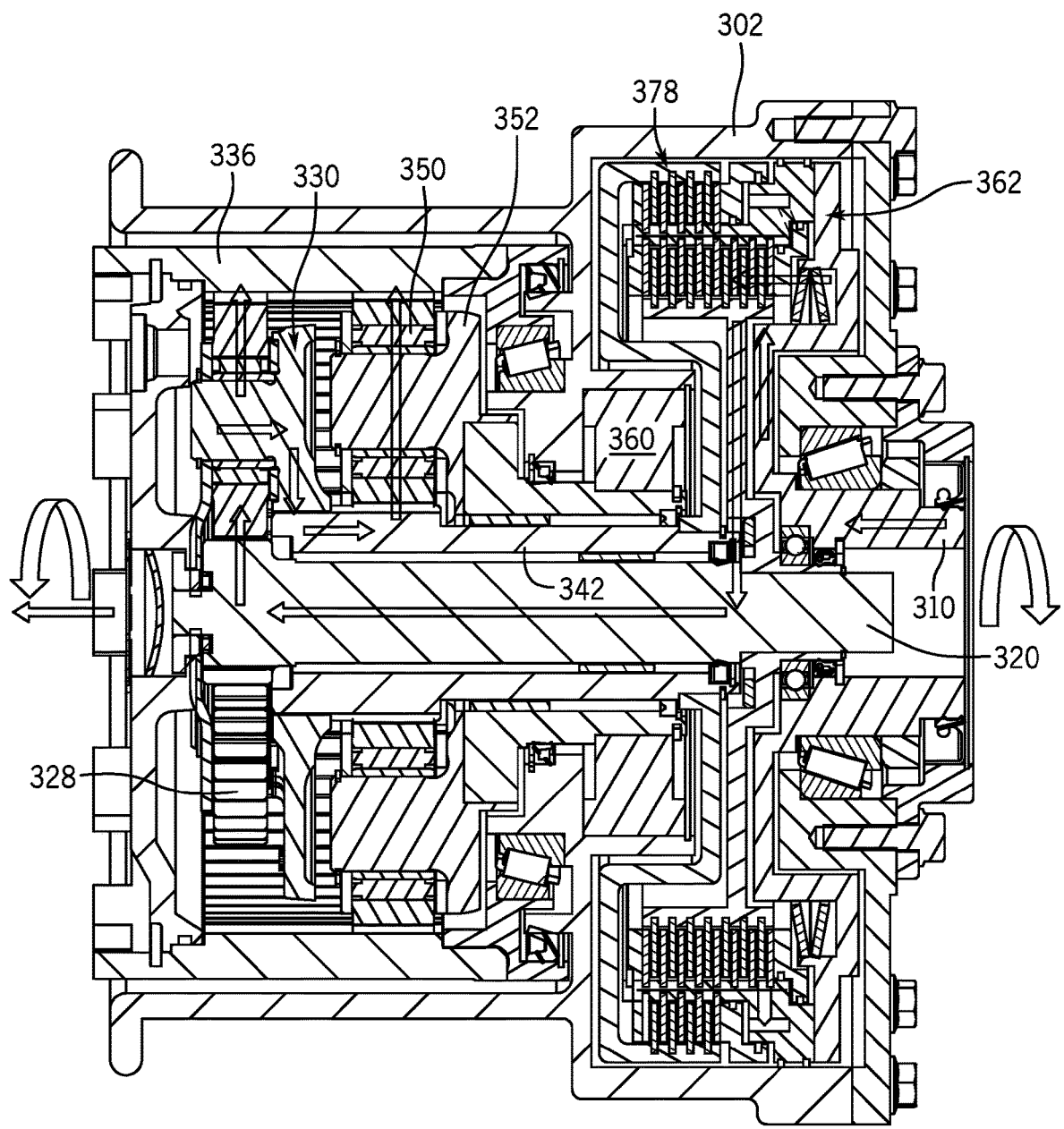
FIG. 6 is a sectional view of the power transmission assembly of FIG. 4 depicting a schematic representation of a power flow path in a first engine start mode of the example starter-generator device.

Reference is initially made to FIG. 6, which is a cross-sectional view of the power transmission assembly 132 similar to that of FIG. 4 annotated with power flow arrows. The power flow arrows of FIG. 6 particularly depict operation of the power transmission assembly 132 in the cold engine start mode.

In the cold engine start mode, the engine 120 is initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. In the cold engine start mode, the SAHR clutch assembly 362 is engaged and the HASR clutch assembly 378 is disengaged. Since the SAHR clutch assembly 362 is engaged, the input shaft 310 is locked for rotation with first-stage sun gear shaft 324. As such, the rotation of the input shaft 310 drives rotation of the first-stage sun gear 322, and in turn, rotation of the first-stage sun gear 322 drives rotation of the first-stage planet gears 328.

The first-stage planet gears 328 drive the first-stage planet carrier 330, which as noted above is splined with the second-stage sun gear 342. As a result, the first-stage planet carrier 330 drives the second-stage sun gear 342 and thus the second-stage planet gears 350 in the first clock direction D1. Upon movement in the first clock direction D1, the overrun clutch assembly 360 is engaged such that the second-stage planet carrier 352 is fixed to the stationary housing 302 and prevented from rotating.

Since the number of first-stage planet gears 328 in the power flow path is an odd number (e.g., 1), the first-stage planet gears 328 drive the ring gear 336 in the opposite direction (e.g., the second clock direction D2) relative to the first-stage sun gear 322 rotating in the first clock direction D1. As noted above, the ring gear 336 functions as the power transfer element 133 to interface with the crank shaft 122 of the engine 120 to drive and facilitate engine start. In effect, during the cold engine start mode, the power transmission assembly 132 operates as a sun-in, ring-out configuration.

In one example, the power transmission assembly 132 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 200, a resulting 60:1 gear ratio (e.g., approximately 40:1 to about 120:1) may be achieved for the starter-generator device 130 between the electric machine 134 and the engine 120 during the cold engine start mode. As such, if for example the electric machine 134 is rotating at 10,000 RPM, the crank shaft 122 of the engine 120 rotates at about 100-150 RPM. Accordingly, the electric machine 134 may thus have normal operating speeds with relatively lower speed and higher torque output for cold engine start up.

Figure 7:
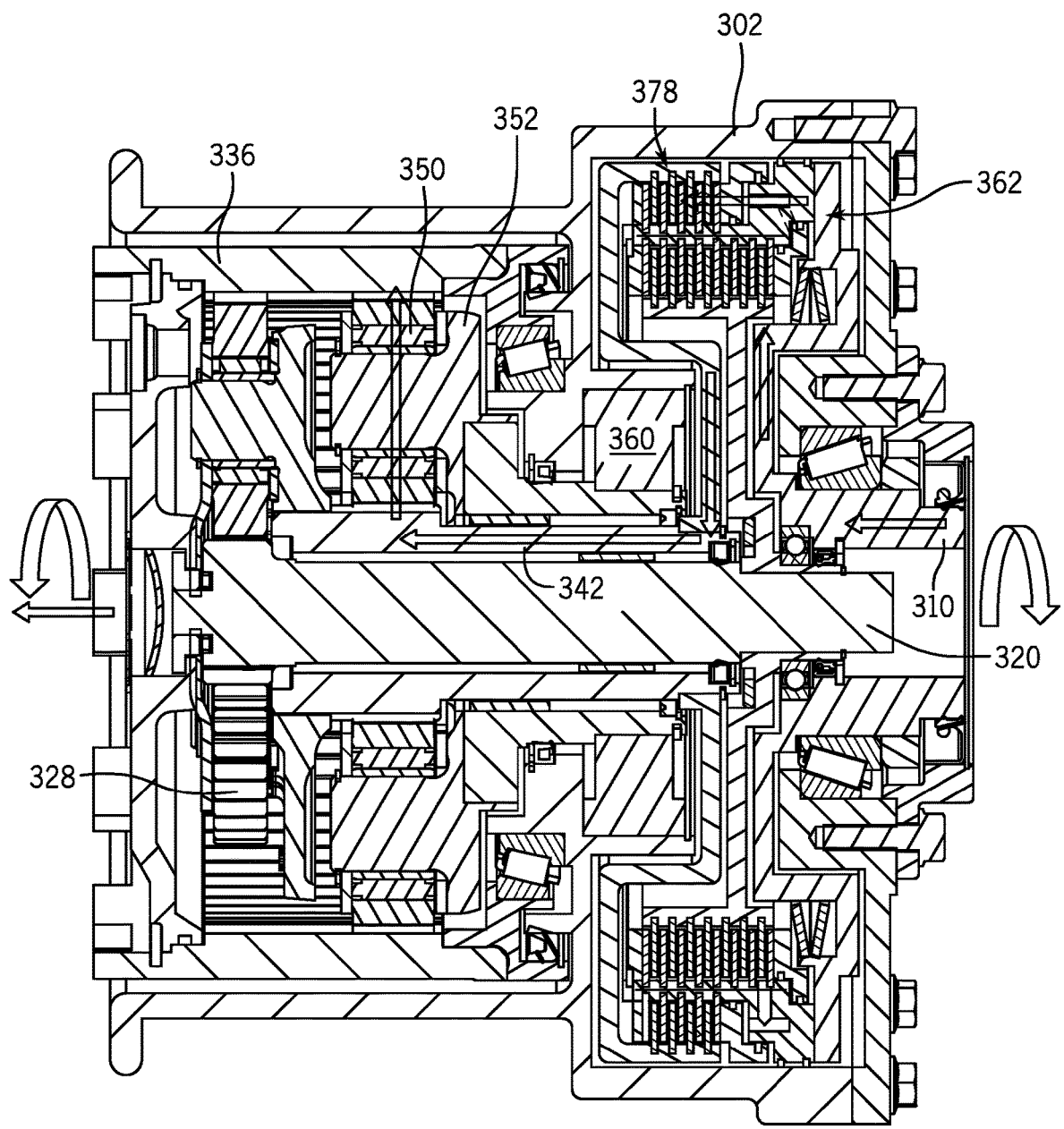
FIG. 7 is a sectional view of the power transmission assembly of FIG. 4 depicting a schematic representation of a power flow path in a second engine start mode of the example starter-generator device.

Reference is now made to FIG. 7, which is a cross-sectional view of the power transmission assembly 132 similar to that of FIG. 4 annotated with power flow arrows. The power flow arrows of FIG. 7 particularly depict operation of the power transmission assembly 132 in the warm engine start mode.

In the warm engine start mode, the engine 120 may be inactive or active. In any event, the controller 150 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. In the warm engine start mode, the HASR clutch assembly 378 is engaged and the SAHR clutch assembly 362 is disengaged. Since the HASR clutch assembly 378 is engaged, the input shaft 310 is locked for rotation with second-stage sun gear 342. As such, the rotation of the input shaft 310 drives rotation of the second-stage sun gear 342, and in turn, rotation of the second-stage sun gear 342 drives rotation of the second-stage planet gears 350. The second-stage planet gears 350 are mounted on the second-stage planet carrier 352. Upon movement in the first clock direction D1, the overrun clutch assembly 360 engages such that the second-stage planet carrier 352 is fixed to the stationary housing 302 and prevented from rotating. Since the position of the second-stage planet carrier 352 is locked by the overrun clutch assembly 360, the rotation of second-stage planet gears 350 by the second-stage sun gear 342 operates to drive the ring gear 336.

Since the number of second-stage planet gears 350 in the power flow path is an odd number (e.g., 1) in the radial direction, the second-stage planet gears 350 drive the ring gear 336 in the opposite direction (e.g., the second clock direction D2) relative to the second-stage sun gear 342 rotating in the first clock direction D1. As noted above, the ring gear 336 functions as the power transfer element 133 to interface with the crank shaft 122 of the engine 120 to drive and facilitate engine start. In effect, during the warm engine start mode, the power transmission assembly 132 operates as a sun-in, ring-out configuration, albeit at a lower gear ratio as compared to the cold engine start mode resulting from using the ratio of the second-stage planet gears 350 as opposed to the compounded ratio of the first- and second-stage planet gears 328, 350.

In one example, the power transmission assembly 132 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 200, a resulting 16:1 gear ratio (e.g., approximately 12:1 to about 28:1) may be achieved for the starter-generator device 130 between the electric machine 134 and the engine 120 during the warm engine start mode. As such, if for example the electric machine 134 is rotating at 10,000 RPM, the crank shaft 122 of the engine 120 rotates at about 600-700 RPM. Accordingly, the electric machine 134 may thus have normal operating speeds with a relatively lower speed and higher torque output for engine start up or boost.

Figure 8:
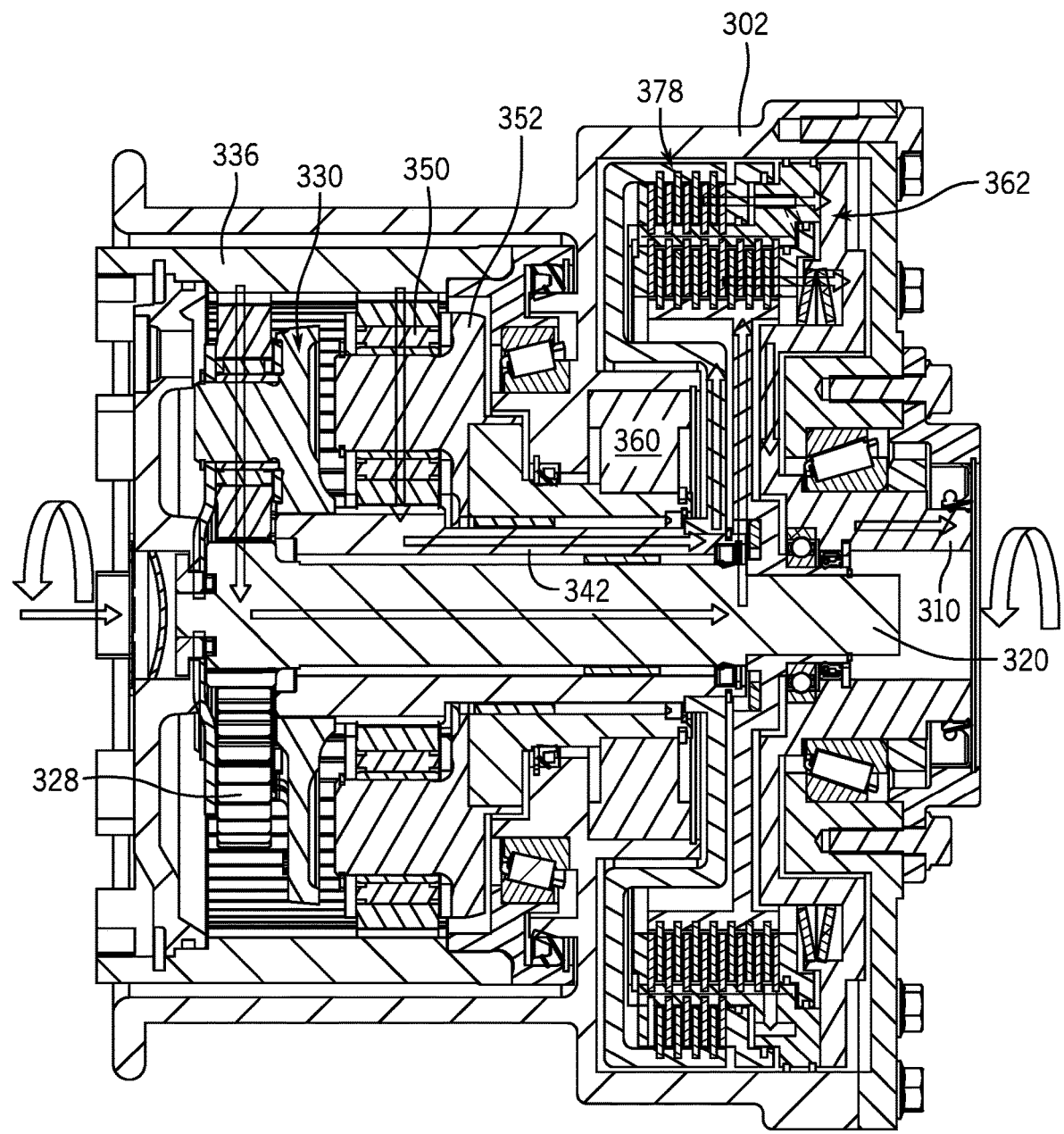
FIG. 8 is a sectional view of the power transmission assembly of FIG. 4 depicting a schematic representation of a power transfer path in a generation mode of the example starter-generator device.

Reference is made to FIG. 8, which is a partial sectional cross-sectional view of the power transmission assembly 132 similar to that of FIG. 4 annotated with power flow arrows. The power flow arrows of FIG. 8 particularly depict operation of the power transmission assembly 132 in the generation mode.

Subsequent to either or both of the engine start modes, the engine 120 begins to accelerate above rotational speed provided by power transmission assembly 132, and the electric machine 134 is commanded to decelerate and to cease providing torque to power transmission assembly 132. After the engine 120 has stabilized to a sufficient speed and the electric machine 134 has sufficiently decelerated or stopped, each of the SAHR and the HASR clutch assemblies 362, 378 are engaged to operate the power transmission assembly 132 in the generation mode. In the generation mode, the engine 120 rotates the crank shaft 122 and power transfer element 133 that is engaged with the ring gear 336, thus driving the ring gear 336 in the second clock direction D2. The ring gear 336 drives the first-stage planet gears 328 and the second-stage planet gears 350, which respectively drive the first-stage sun gear 322 and the second-stage sun gear 342. In the generation mode, the overrun clutch assembly 360 is disengaged. Since the SAHR clutch assembly 362 and HASR clutch assembly 378 are engaged, the rotation of the first-stage and second-stage sun gears 322, 342 is transferred to the input shaft 310 via the input shaft clutch element 316. Therefore, as the ring gear 336 rotates in the second clock direction D2, the input shaft 310 is driven and similarly rotates in the second clock direction D2 at the same rate of rotation. As noted above, the input shaft 310 is connected with and provides output power to the electric machine 134 in the second clock direction D2 via the power transfer belt arrangement 200. In effect, during the generation mode, the power transmission assembly 132 operates as a ring-in, sun-out configuration.

In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation.

The power transmission assembly 132 discussed above with reference to FIGS. 1-8 includes power flow paths in which the active clutch assemblies 362, 378 are actuated by dedicated control valves 154, 156. Other mechanisms may be provided.

Figure 9:
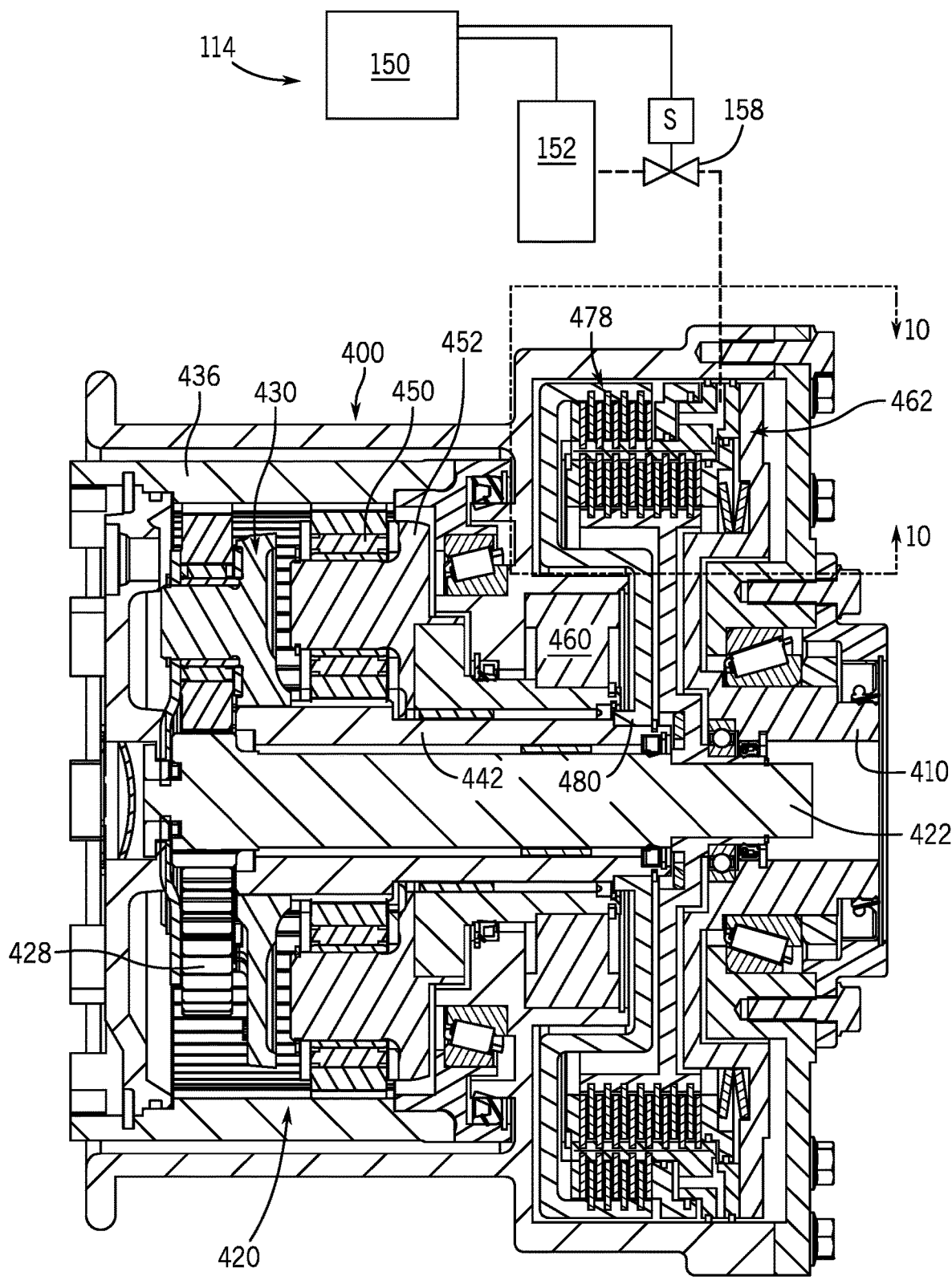
FIG. 9 is a cross-sectional view of a further example power transmission assembly of the example starter-generator device that may be implemented in the work vehicle of FIG. 1.

Reference is now made to FIG. 9, which is a cross-sectional view of a power transmission assembly 400 that may be implemented into the starter-generator device 130 according to a further embodiment. Additional reference is made to FIGS. 10-12, which are partial, more detailed views of the power transmission assembly 400. In this embodiment, the power transmission assembly 400 is fluidly coupled to the hydraulic system 152 (as above) via a single control valve 158 based on command signals from the controller 150 (as above). Collectively, one or more of the control valve 158, the hydraulic system 152, power transmission assembly 132, and the controller 150 may be considered a power control system 114 that functions to implement the appropriate power flow path between the engine 120 and the electric machine 134.

Unless otherwise noted, the power transmission assembly 400 is similar to the power transmission assembly 132 discussed above. In particular, the power transmission assembly 400 includes a gear set 420 with an input shaft 410, a first-stage sun gear 422, first-stage planet gears 428, first-stage planet carrier 430, a ring gear 436, a second-stage sun gear 442, second-stage planet gears 450, and second-stage planet carrier 452 as above. The power transmission assembly 400 further includes an overrun clutch 460, a first or SAHR clutch assembly 462, and a second or HASR clutch assembly 478. As above, during the cold engine start mode, the first clutch assembly 462 is engaged such that the power flows from the input shaft 410, through the first-stage sun gear 422, through the first-stage planet gears 428, and out of the ring gear 436; during the warm engine start mode, the second clutch assembly 478 is engaged such that the power flows from the input shaft 410, through the second-stage sun gear 442, through the second-stage planet gears 450, and out of the ring gear 436; and during the generation mode, the first and second clutch assemblies 462, 478 are engaged such that the power flows from the ring gear 436, through the first-stage and second-stage planet gears 428, 450, through the first-stage and second-stage sun gears 422, 442, and out of the input shaft 410.

As shown, the SAHR clutch assembly 462 includes a SAHR clutch hub 464 that is mounted on and engaged for rotation with the first-stage sun gear 422. A SAHR clutch flange 466 extends radially outward from the SAHR clutch hub 464 and includes a set of SAHR clutch plates 468 on a radial end. The SAHR clutch plates 468 extend radially outward from the SAHR clutch flange 466 and are positioned in an axial row so as to be interleaved between the inwardly extending set of plates 415 of the input shaft clutch element 416. The SAHR clutch assembly 462 further includes a SAHR clutch spring 470 and a SAHR piston 472 that operate to reposition the SAHR clutch assembly 462 between the engaged position and the disengaged position. During operation, SAHR clutch spring 470 functions to urge the SAHR clutch assembly 462 into the engaged position such that the SAHR clutch plates 468 frictionally engage the input shaft clutch element plates 415 of the input shaft clutch element 416, thereby locking the SAHR clutch assembly 462 and the first-stage sun gear 422 into rotational engagement with the input shaft clutch element 416 and the input shaft 410. The SAHR piston 472 is coupled to the SAHR clutch plates 468 and is positioned relative to the input shaft clutch element 416 to form a cavity 476. As schematically shown, the cavity 476 is fluidly coupled to a source of fluid pressure, described below. When fluid is introduced into the cavity 476, the hydraulic force on the SAHR piston 472 functions to overcome the force of the SAHR clutch spring 470 and urge the SAHR clutch plates 468 out of engagement with the clutch element plate 415 and into the disengaged position. Subsequently, upon release the hydraulic pressure, the SAHR clutch spring 470 repositions the SAHR clutch assembly 462 back into the engaged position.

The HASR clutch assembly 478 is formed by a HASR hub 480 that is mounted on and engaged for rotation with the second-stage sun gear 442. A HASR flange 482 extends from the HASR hub 480 and includes inwardly extending HASR plates 484. The HASR clutch plates 484 extend radially outward from the HASR flange 482 and are positioned in an axial row so as to be interleaved between the outwardly extending set of plates 417 of the input shaft clutch element 416. The HASR clutch assembly 478 further includes a HASR spring 486 (schematically shown) and HASR piston 488 that operate to reposition the HASR clutch assembly 478 between an engaged position and a disengaged position. The HASR clutch spring 486 may be arranged in any suitable position, including between the input shaft clutch element 416 and the HASR clutch plates 484. The HASR piston 488 is coupled to the HASR clutch plates 484 and is positioned relative to the clutch element 416 to form a cavity 490. As schematically shown, the cavity 476 is fluidly coupled to a source of fluid pressure, described below. When fluid is introduced into the cavity 476, the fluid pressure in the cavity 490 operates to overcome the force of the HASR clutch spring 486 and urge the HASR clutch assembly 478 into the engaged position such that the HASR clutch plates 484 frictionally engage the input shaft clutch element plates 417 of the input shaft clutch element 416, thereby locking the HASR clutch assembly 478 and the second-stage sun gear 442 into rotational engagement with the clutch element 416 and the input shaft 410. Upon release of the hydraulic pressure in the cavity 490, the HASR clutch spring 486 functions to urge the HASR clutch assembly 478 into the disengaged position such that the HASR clutch plates 484 are separated from the clutch element plates 417, thereby enabling mutually independent rotation of the second-stage sun gear 442 and the input shaft 410.

In this implementation, and in contrast to the embodiment of FIG. 4, the SAHR and HASR clutch assemblies 462, 478 of the embodiment of FIG. 9 are operated with a single control valve 158. As shown, a fluid passage 492 is formed in the input shaft clutch element 416, and the fluid passage 492 functions to fluidly couple the hydraulic system 152 to the cavities 476, 490 via the control valve 158. The fluid passage 492 is formed by a common branch 494, a SAHR branch 496 extending between the common branch 494 and the SAHR cavity 476, and a HASR branch 498 extending between the common branch 494 and the HASR cavity 490. The single control valve 158 introduces and releases fluid into and out of the fluid passage 492, and thus both cavities 476, 490, in order to actuate the clutch assemblies 462, 478, as will be described below.

Figure 10:
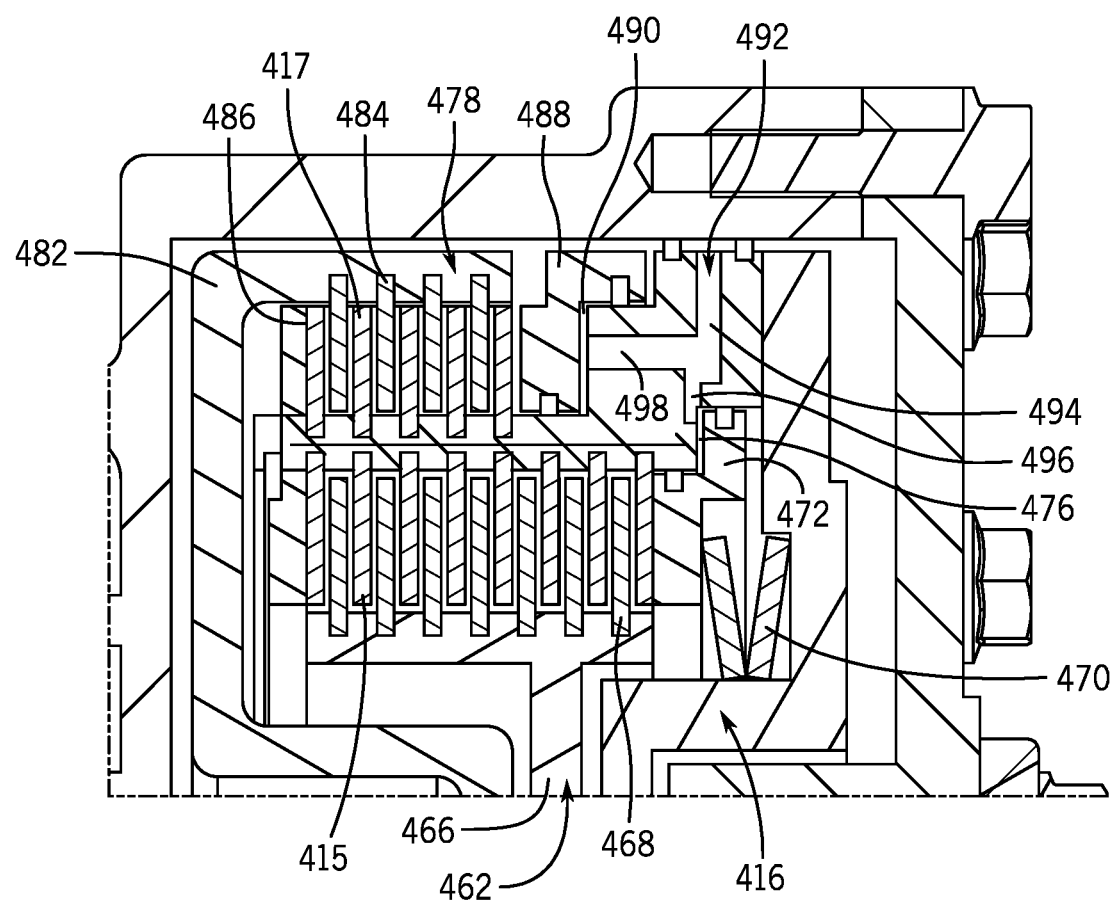
FIGS. 10 and 11 are more detailed views of a portion of the power transmission assembly of FIG. 9 for the example starter-generator device.
Figure 11:
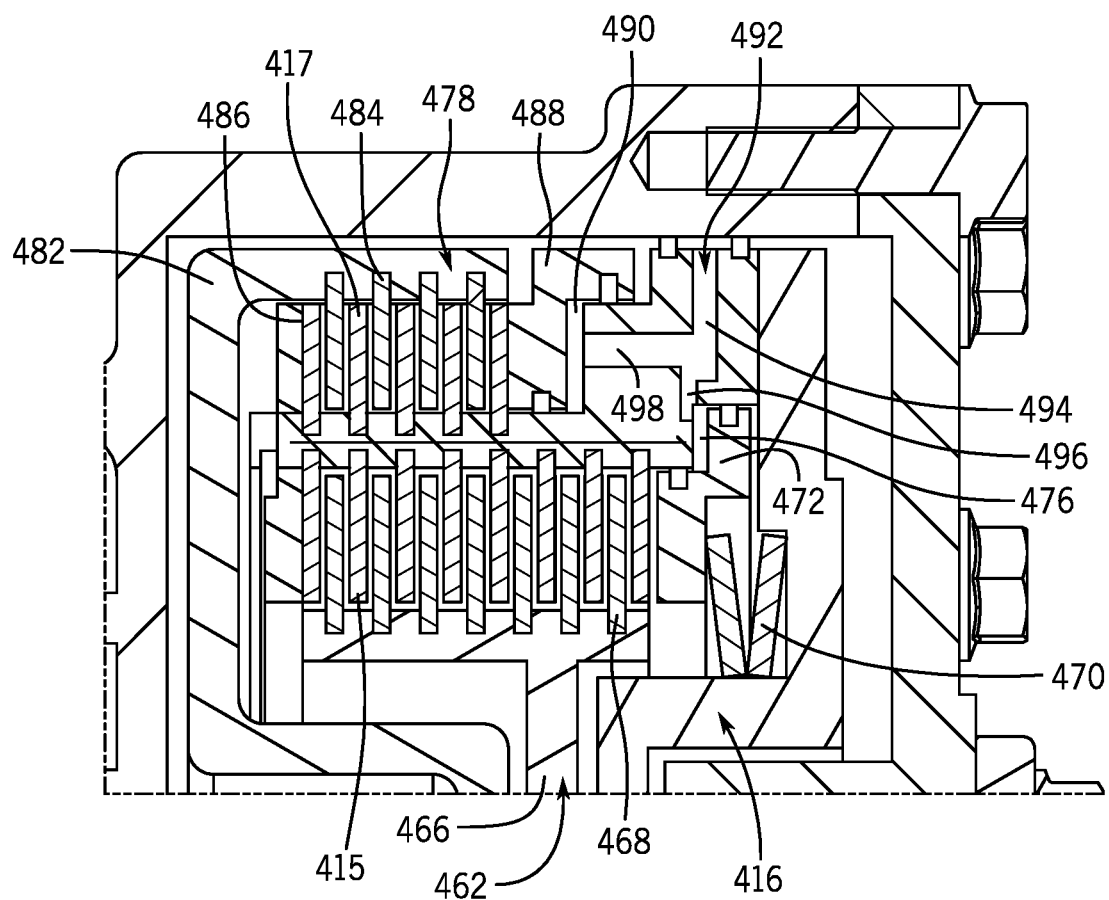
Figure 12:
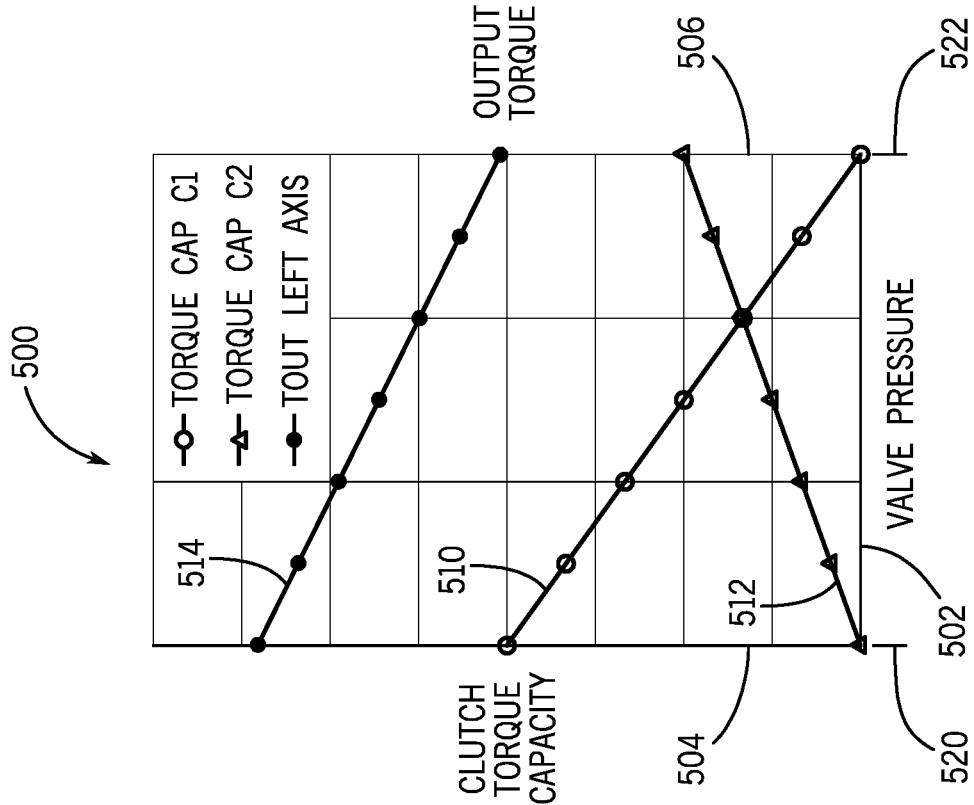
FIG. 12 is a graph depicting the relationship between control valve pressure, clutch torque capacity, and output torque during engine start modes of the power transmission assembly of FIG. 9.

Reference is made to FIG. 10, which is a partial closer view of the power transmission assembly 400 during the cold engine start mode; and FIG. 11, which is a partial closer view of the power transmission assembly 400 during the warm engine start mode. Additional reference is made to FIG. 12, which is a graph 500 depicting the relationship between valve pressure, clutch torque capacity, and output torque during the cold and warm engine start modes. In particular, valve pressure is reflected on the horizontal axis 502, clutch torque capacity is reflected on the left vertical axis 504, and output torque is reflected on the right vertical axis 506. As shown in FIG. 12, a first line 510 represents the clutch torque capacity of the SAHR clutch assembly 462 in view of valve pressure from the control valve 158; a second line 512 represents the clutch torque capacity of the HASR clutch assembly 478 in view of valve pressure from the control valve 158; and a third line 514 represents the output torque in view of in view of valve pressure from the control valve 158.

The valve pressure at value 520 reflects the position of the control valve 158 during the cold engine start mode. As shown, value 520 corresponds to a low or "off" valve pressure. At this value 520, the SAHR clutch assembly 462 is engaged as a result of the spring force of spring 470, as reflected by the relatively high clutch torque capacity of line 510, and the HASR clutch assembly 478 is disengaged as a result of the spring force of spring 486, as reflected by the relatively low clutch torque capacity. The positions of the clutch assemblies 462, 478 in these positions is depicted in FIG. 10.

In order to transition to the warm engine start mode, the control valve 158 increases the valve pressure. As a result of the pressure increase, the clutch torque capacity of the SAHR clutch assembly 462 decreases (as reflected by line 510) and the clutch capacity of the HASR clutch assembly 478 increases (as reflected by line 512). As the HASR clutch assembly 478 engages and the SAHR clutch assembly 462 disengages, the power flow path of the torque transitions from being transferred through the SAHR clutch assembly 462 to being transferring through the HASR clutch assembly 478.

The valve pressure at value 522 reflects the position of the control valve 158 during the warm engine start mode. As shown, the value 522 corresponds to a high valve pressure. At this value 522, the SAHR clutch assembly 462 is disengaged as a result of fluid pressure, as reflected by the relatively low clutch torque capacity of line 510, and the HASR clutch assembly 478 is engaged as a result of the fluid pressure, as reflected by the relatively high clutch torque capacity. The positions of the clutch assemblies 462, 478 in these positions is depicted in FIG. 11.

Figure 14:
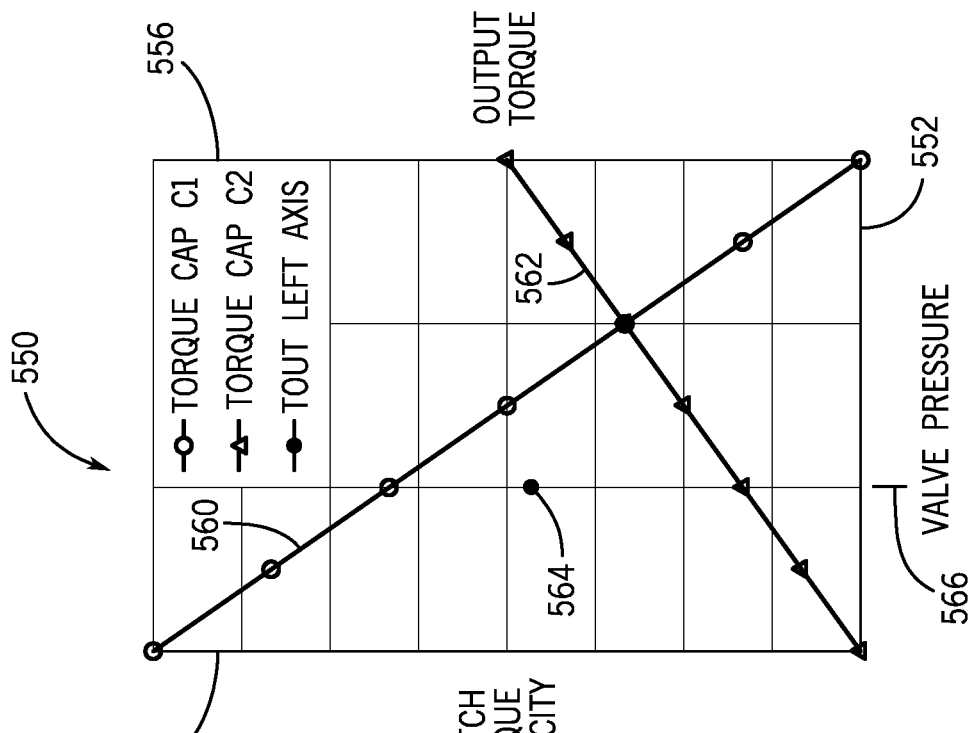
FIG. 14 is a graph depicting the relationship between control valve pressure, clutch torque capacity, and output torque during a generation mode of the power transmission assembly of FIG. 9.
Figure 13:
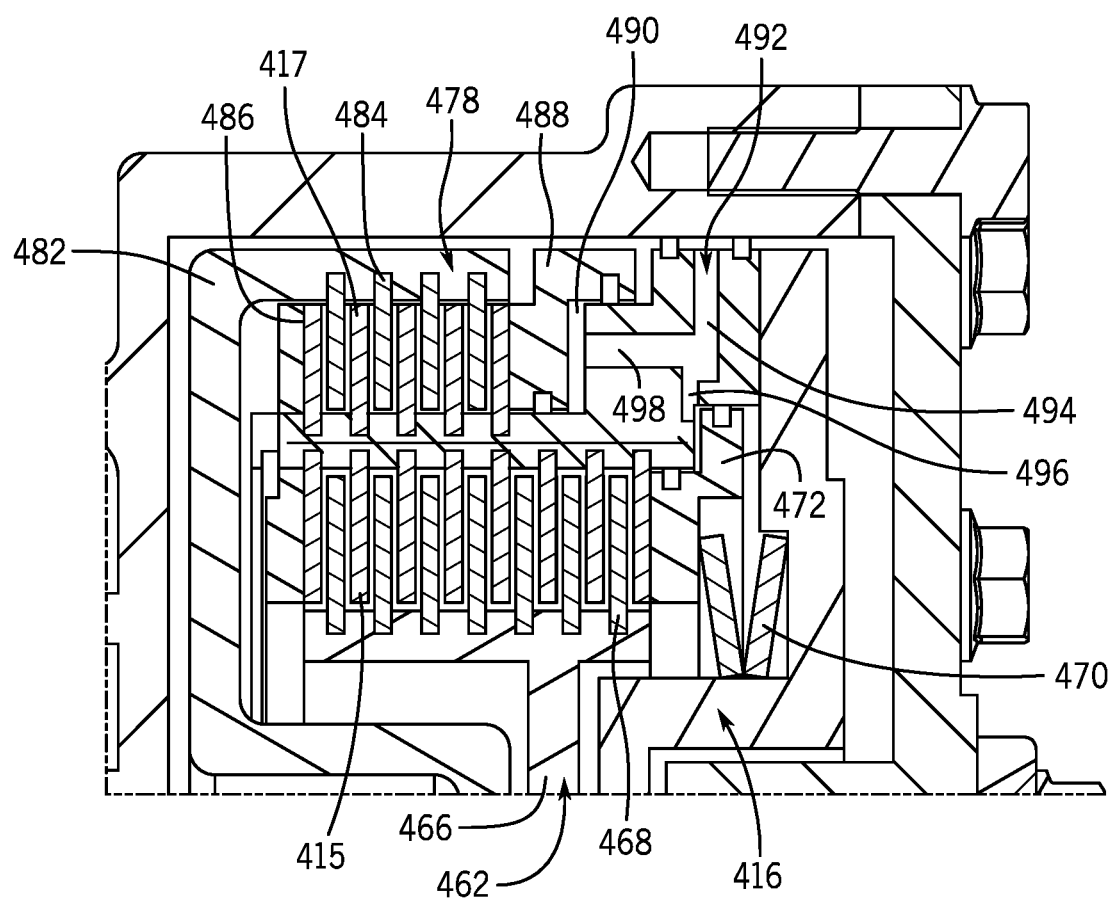
FIG. 13 is a further more detailed view of a portion of the power transmission assembly of FIG. 9 for the example starter-generator device.

In the generation mode, the engine 120 operates to drive the electric machine 134 such that the power flows in an opposite direction relative to the engine start modes. Reference is made to FIG. 13, which is a partial closer view of the power transmission assembly 132 during the generation mode. Additional reference is made to FIG. 14, which is a graph 550 depicting the relationship between control valve pressure, clutch torque capacity, and output torque during the generation mode. In particular, valve pressure is reflected on the horizontal axis 552, clutch torque capacity is reflected on the left vertical axis 554, and output torque is reflected on the right vertical axis 556. As shown in FIG. 14, a first line 560 represents the clutch torque capacity of the SAHR clutch assembly 462 in view of valve pressure from the control valve 158, and a second line 562 represents the clutch torque capacity of the HASR clutch assembly 478 in view of valve pressure from the control valve 158. An output torque point 564 represents the output torque of the power transmission assembly 132 in view of in view of valve pressure from the control valve 158.

As noted above, an increase in valve pressure operates to decrease the clutch torque capacity of the SAHR clutch assembly 462, as reflected by line 552, and to increase the clutch torque capacity of the HASR clutch assembly 478, as reflected by line 554. At an operating point 566 of an intermediate control valve pressure, the SAHR and HASR clutch assemblies 462, 478 have balanced clutch torque capacities to result in the output torque point 564, which is sufficient to provide the system maximum torque in the generation mode.

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using planetary gear sets in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved. Embodiments discussed above include a double planetary gear set, sun in, ring out configuration to provide warm and cold engine start modes and a ring in, sun out configuration to provide a generation mode. As such, a three mode assembly may be provided. Control of the gear set may be implemented with dedicated control valves or a single control valve.

Also, the following examples are provided, which are numbered for easier reference.

1. A power control system for a work vehicle with an engine, the power control system comprising: a combination starter-generator device, having: an electric machine; a gear set configured to receive rotational input from the electric machine and from the engine and to couple the electric machine and the engine in a first power flow direction and a second power flow direction, the gear set configured to operate in one of multiple relatively high-torque, low-speed start gear ratios in the first power flow direction, including a first start gear ratio corresponding to a cold engine start mode and a second start gear ratio corresponding to a warm engine start mode, the gear set further configured to operate in a relatively low-torque, high-speed gear ratio in the second power flow direction corresponding to a generation mode; and a first clutch assembly and a second clutch assembly selectively coupled to the gear set to effect the first start gear ratio during the cold engine start mode and the second start gear ratio during the warm engine start mode; and a control valve fluidly coupled to selectively apply a fluid pressure to the first clutch assembly and to the second clutch assembly.

2. The power control system of example 1, wherein the control valve is a single solenoid valve.

3. The power control system of example 1, wherein the first clutch assembly is engaged during the cold engine start mode to result in the gear set operating according to the first start gear ratio, disengaged during the warm engine start mode to result in the gear set operating according to the second start gear ratio, and engaged in the second power flow direction; and wherein the second clutch assembly is disengaged during the cold engine start mode to result in the gear set operating according to the first start gear ratio, engaged during the warm engine start mode to result in the gear set operating according to the second start gear ratio, and engaged in the second power flow direction.

4. The power control system of example 1, further comprising a controller configured to generate command signals to the control valve to selectively actuate the first clutch assembly between a first engaged position and a first disengaged position and to selectively actuate the second clutch assembly between a second engaged position and a second disengaged position.

5. The power control system of example 4, wherein the controller, in the cold engine start mode, is configured to generate the command signals for the control valve such that the first clutch assembly is in the first engaged position and the second clutch assembly is in the second disengaged position, wherein the controller, in the warm engine start mode, is configured to generate the command signals for the control valve such that the first clutch assembly is in the first disengaged position and the second clutch assembly is in the second engaged position, and wherein the controller, in the generation mode, is configured to generate the command signals for the control valve such that the first clutch assembly is in the first engaged position and the second clutch assembly is in the second engaged position.

6. The power control system of example 5, wherein the controller, in the cold engine start mode, is configured to generate the command signals for the control valve to apply a first fluid pressure value, wherein the controller, in the warm engine start mode, is configured to generate the command signals for the control valve to apply a second fluid pressure value, greater than the first fluid pressure value, and wherein the controller, in the generation mode, is configured to generate the command signals for the control valve to apply a third fluid pressure value, in between the first fluid pressure value and the second fluid pressure value.

7. The power control system of example 6, wherein the first clutch assembly includes a first spring configured to urge the first clutch assembly into the first engaged position and a first piston proximate to a first cavity that, when supplied with fluid pressure, resists the first spring and urges the first clutch assembly into the first disengaged position, wherein the second clutch assembly includes a second spring configured to urge the second clutch assembly into the second disengaged position and a second piston proximate to a second cavity that, when supplied with fluid pressure, resists the second spring and urges the second clutch assembly into the second engaged position, and wherein the combination starter-generator device further comprises a fluid passage that fluidly couples the control valve to the first cavity and the second cavity.

8. The power control system of example 7, wherein the fluid passage is formed by a common branch fluidly coupled to the control valve, a first branch extending between the common branch and the first cavity, and a second branch extending between the common branch and the second cavity.

9. The power control system of example 1, wherein the gear set is bi-directional in that, in the first power flow direction, the gear set receives input power from the electric machine in a first clock direction and outputs power to the engine in a second clock direction opposite the first clock direction; and wherein, in the second power flow direction, input power from the engine is in the second clock direction and output power to the electric machine is in the second clock direction.

10. The power control system of example 9, further including a belt and pulley coupled to the gear set and the electric machine, wherein input power in the first power flow direction is conveyed from the electric machine to the gear set by the belt and pulley, and wherein in the first power flow direction the belt and pulley rotate in the first clock direction and in the second power flow direction the belt and pulley rotate in the second clock direction.

11. The power control system of example 10, further including a single belt tensioner applying tension to a first side of the belt in both the first power direction and the second power flow direction.

12. The power control system of example 1, wherein the starter-generator device further includes a third clutch assembly that is engaged during the first start gear ratio and the second start gear ratio and disengaged in second power flow direction.

13. The power control system of example 12, wherein the third clutch assembly is a one-way mechanically-actuated clutch.

14. The power control system of example 1, wherein the gear set includes a compound epicyclic gear train including first-stage and second-stage sun gears, first-stage and second-stage planet gears, first-stage and second-stage carriers, and a ring gear; and wherein the first-stage planet gears have a different tooth count than the second-stage planet gears.

15. The power control system of example 14, wherein rotational power from the electric machine moves in the first power flow direction from the first-stage sun gear to the ring gear to the engine, and wherein rotational power from the engine moves in the second power flow direction from the ring gear to the first-stage sun gear to the electric machine, and wherein the combination starter-generator device further includes a third clutch assembly coupled to the gear set and disposed between the engine and the electric machine, and wherein the third clutch assembly is configured to engage during the first start gear ratio and the second start gear ratio to couple the second-stage carrier to a housing of the gear set and to disengage in the second power flow direction to uncouple the second-stage carrier from the housing of the gear set.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power control system for a work vehicle with an engine, the power control system comprising:
a combination starter-generator device, having:
an electric machine;
a gear set configured to receive rotational input from the electric machine and from the engine and to couple the electric machine and the engine in a first power flow direction and a second power flow direction, the gear set configured to operate in one of multiple relatively high-torque, low-speed start gear ratios in the first power flow direction, including a first start gear ratio corresponding to a cold engine start mode and a second start gear ratio corresponding to a warm engine start mode, the gear set further configured to operate in a relatively low-torque, high-speed gear ratio in the second power flow direction corresponding to a generation mode; and
a first clutch assembly and a second clutch assembly selectively coupled to the gear set to effect the first start gear ratio during the cold engine start mode and the second start gear ratio during the warm engine start mode; and
a control valve fluidly coupled to selectively apply a fluid pressure to the first clutch assembly and to the second clutch assembly.

2. The power control system of claim 1, wherein the control valve is a single solenoid valve.

3. The power control system of claim 1, wherein the first clutch assembly is engaged during the cold engine start mode to result in the gear set operating according to the first start gear ratio, disengaged during the warm engine start mode to result in the gear set operating according to the second start gear ratio, and engaged in the second power flow direction; and wherein the second clutch assembly is disengaged during the cold engine start mode to result in the gear set operating according to the first start gear ratio, engaged during the warm engine start mode to result in the gear set operating according to the second start gear ratio, and engaged in the second power flow direction.

4. The power control system of claim 1, further comprising a controller configured to generate command signals to the control valve to selectively actuate the first clutch assembly between a first engaged position and a first disengaged position and to selectively actuate the second clutch assembly between a second engaged position and a second disengaged position.

5. The power control system of claim 4,
wherein the controller, in the cold engine start mode, is configured to generate the command signals for the control valve such that the first clutch assembly is in the first engaged position and the second clutch assembly is in the second disengaged position,
wherein the controller, in the warm engine start mode, is configured to generate the command signals for the control valve such that the first clutch assembly is in the first disengaged position and the second clutch assembly is in the second engaged position, and
wherein the controller, in the generation mode, is configured to generate the command signals for the control valve such that the first clutch assembly is in the first engaged position and the second clutch assembly is in the second engaged position.

6. The power control system of claim 5,
wherein the controller, in the cold engine start mode, is configured to generate the command signals for the control valve to apply a first fluid pressure value,
wherein the controller, in the warm engine start mode, is configured to generate the command signals for the control valve to apply a second fluid pressure value, greater than the first fluid pressure value, and
wherein the controller, in the generation mode, is configured to generate the command signals for the control valve to apply a third fluid pressure value, in between the first fluid pressure value and the second fluid pressure value.

7. The power control system of claim 6,
wherein the first clutch assembly includes a first spring configured to urge the first clutch assembly into the first engaged position and a first piston proximate to a first cavity that, when supplied with fluid pressure, resists the first spring and urges the first clutch assembly into the first disengaged position,
wherein the second clutch assembly includes a second spring configured to urge the second clutch assembly into the second disengaged position and a second piston proximate to a second cavity that, when supplied with fluid pressure, resists the second spring and urges the second clutch assembly into the second engaged position, and
wherein the combination starter-generator device further comprises a fluid passage that fluidly couples the control valve to the first cavity and the second cavity.

8. The power control system of claim 7, wherein the fluid passage is formed by a common branch fluidly coupled to the control valve, a first branch extending between the common branch and the first cavity, and a second branch extending between the common branch and the second cavity.

9. The power control system of claim 1,
wherein the gear set is bi-directional in that, in the first power flow direction, the gear set receives input power from the electric machine in a first clock direction and outputs power to the engine in a second clock direction opposite the first clock direction; and
wherein, in the second power flow direction, input power from the engine is in the second clock direction and output power to the electric machine is in the second clock direction.

10. The power control system of claim 9, further including a belt and pulley coupled to the gear set and the electric machine, wherein input power in the first power flow direction is conveyed from the electric machine to the gear set by the belt and pulley, and wherein in the first power flow direction the belt and pulley rotate in the first clock direction and in the second power flow direction the belt and pulley rotate in the second clock direction.

11. The power control system of claim 10, further including a single belt tensioner applying tension to a first side of the belt in both the first power direction and the second power flow direction.

12. The power control system of claim 1, wherein the starter-generator device further includes a third clutch assembly that is engaged during the first start gear ratio and the second start gear ratio and disengaged in second power flow direction.

13. The power control system of claim 12, wherein the third clutch assembly is a one-way mechanically-actuated clutch.

14. The power control system of claim 1,
wherein the gear set includes a compound epicyclic gear train including first-stage and second-stage sun gears, first-stage and second-stage planet gears, first-stage and second-stage carriers, and a ring gear; and wherein the first-stage planet gears have a different tooth count than the second-stage planet gears.

15. The power control system of claim 14, wherein rotational power from the electric machine moves in the first power flow direction from the first-stage sun gear to the ring gear to the engine, and wherein rotational power from the engine moves in the second power flow direction from the ring gear to the first-stage sun gear to the electric machine.

16. The power control system of claim 15, wherein the combination starter-generator device further includes a third clutch assembly coupled to the gear set and disposed between the engine and the electric machine, and wherein the third clutch assembly is configured to engage during the first start gear ratio and the second start gear ratio to couple the second-stage carrier to a housing of the gear set and to disengage in the second power flow direction to uncouple the second-stage carrier from the housing of the gear set.

17. The power control system of claim 16, wherein the third clutch assembly is a one-way mechanically-actuated clutch.

18. A power system for a work vehicle, comprising:
an engine;
an electric machine;
a combination starter-generator device, having:
  a gear set configured to receive rotational input from the electric machine and from the engine and to couple the electric machine and the engine in a first power flow direction and a second power flow direction, the gear set configured to operate in one of multiple relatively high-torque, low-speed start gear ratios in the first power flow direction, including a first start gear ratio corresponding to a cold engine start mode and a second start gear ratio corresponding to a warm engine start mode, the gear set further configured to operate in a relatively low-torque, high-speed gear ratio in the second power flow direction corresponding to a generation mode;
  a first clutch assembly coupled to the gear set, wherein the first clutch assembly is engaged during the cold engine start mode to result in the gear set operating according to the first start gear ratio, disengaged during the warm engine start mode to result in the gear set operating according to the second start gear ratio, and engaged in the second power flow direction;
  a second clutch assembly coupled to the gear set, wherein the second clutch assembly is disengaged during the cold engine start mode to result in the gear set operating according to the first start gear ratio, engaged during the warm engine start mode to result in the gear set operating according to the second start gear ratio, and engaged in the second power flow direction; and
  a third clutch assembly that is engaged in first power flow direction during the cold engine start mode and the warm engine start mode and is disengaged in second power flow direction during the generation mode; and
  a single control valve fluidly coupled to selectively apply a fluid pressure to the first clutch assembly and to the second clutch assembly.

19. The power system of claim 18, further comprising a controller configured to generate command signals for the control valve to selectively actuate the first clutch assembly between a first engaged position and a first disengaged position and to selectively actuate the second clutch assembly between a second engaged position and a second disengaged position,
  wherein the controller, in the cold engine start mode, is configured to generate the command signals for the control valve to apply a first fluid pressure value such that the first clutch assembly is in the first engaged position and the second clutch assembly is in the second disengaged position,
  wherein the controller, in the warm engine start mode, is configured to generate the command signals for the control valve to apply a second fluid pressure value such that the first clutch assembly is in the first disengaged position and the second clutch assembly is in the second engaged position, the second fluid pressure value being greater than the first fluid pressure value, and
  wherein the controller, in the generation mode, is configured to generate the command signals for the control valve to apply a third fluid pressure value such that the first clutch assembly is in the first engaged position and the second clutch assembly is in the second engaged position, the third fluid pressure value being in between the first fluid pressure value and the second fluid pressure value.

20. The power system of claim 19, wherein the gear set includes a compound epicyclic gear train including first-stage and second-stage sun gears, first-stage and second-stage planet gears, first-stage and second-stage carriers, and a ring gear;
  wherein the first-stage planet gears have a different tooth count than the second-stage planet gears; and
  wherein rotational power from the electric machine moves in the first power flow direction from the first-stage sun gear to the ring gear to the engine, and rotational power from the engine moves in the second power flow direction from the ring gear to the first-stage sun gear to the electric machine;
  wherein the combination starter-generator device further includes a third clutch assembly coupled to the gear set and disposed between the engine and the electric machine;
  wherein the first clutch assembly is configured to engage during the first start gear ratio and in the second power flow direction to couple the first-stage sun gear to an input member coupled to the electric machine and to disengage during the second start gear ratio to uncouple the first-stage sun gear from the input member;
  wherein the second clutch assembly is configured to disengage during the first start gear ratio to uncouple the second-stage sun gear from the input member and to engage during the second start gear ratio and in the second power flow direction to couple the second-stage sun gear to the input member; and
  wherein the third clutch assembly is configured to engage during the first start gear ratio and the second start gear ratio to couple the second-stage carrier to a housing of the gear set and to disengage in the second power flow direction to uncouple the second-stage carrier from the housing of the gear set.

* * * * *